(12) United States Patent
Murata

(10) Patent No.: US 9,912,277 B2
(45) Date of Patent: Mar. 6, 2018

(54) METHOD OF FORMING A SEMICONDUCTOR DEVICE AND STRUCTURE THEREFOR

(71) Applicant: SEMICONDUCTOR COMPONENTS INDUSTRIES, LLC, Phoenix, AZ (US)

(72) Inventor: Tsutomu Murata, Mizuho (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 66 days.

(21) Appl. No.: 15/242,804

(22) Filed: Aug. 22, 2016

(65) Prior Publication Data

US 2017/0063271 A1    Mar. 2, 2017

Related U.S. Application Data

(60) Provisional application No. 62/211,182, filed on Aug. 28, 2015.

(51) Int. Cl.
*H02P 25/06* (2016.01)
*H02P 25/032* (2016.01)

(52) U.S. Cl.
CPC ............ *H02P 25/06* (2013.01); *H02P 25/032* (2016.02)

(58) Field of Classification Search
CPC ...................................................... H02P 25/032
USPC ..................................................... 318/114, 34
See application file for complete search history.

(56) References Cited

U.S. PATENT DOCUMENTS

| 5,955,799 | A | 9/1999 | Amaya et al. |
| 6,933,629 | B2 * | 8/2005 | Qiu ........................ F16F 7/1011 310/14 |
| 8,736,201 | B2 | 5/2014 | Murata |
| 8,829,843 | B2 | 9/2014 | Murata |
| 2005/0184601 | A1 | 8/2005 | Kweon et al. |

\* cited by examiner

*Primary Examiner* — David S Luo
(74) *Attorney, Agent, or Firm* — Robert F. Hightower

(57) ABSTRACT

In one embodiment, a control circuit for a linear vibration motor may be configured to drive the linear vibration motor to vibrate using a closed loop run mode followed by an open loop run mode, and may be configured to control the linear vibration motor to stop vibrating using an anti-drive signal wherein the frequency is adjusted to be near to an estimated value of the natural frequency of the linear vibration motor.

20 Claims, 12 Drawing Sheets

US 9,912,277 B2

METHOD OF FORMING A SEMICONDUCTOR DEVICE AND STRUCTURE THEREFOR

PRIORITY CLAIM TO PRIOR PROVISIONAL FILING

This application claims priority to prior filed Provisional Application No. 62/211,182 entitled "METHOD OF FORMING A SEMICONDUCTOR DEVICE AND STRUCTURE THEREFOR" filed on Aug. 28, 2015, and having common inventor Tsutomu Murata which is hereby incorporated herein by reference

CROSS-REFERENCE TO RELATED APPLICATIONS

This application is related to an application entitled "METHOD OF FORMING A SEMICONDUCTOR DEVICE AND STRUCTURE THEREFOR" U.S. patent application Ser. No. 15/242,786, having a common assignee, and inventor Tsutomu Murata which is filed concurrently herewith and which is hereby incorporated herein by reference.

This application is also related to an application entitled "METHOD OF FORMING A SEMICONDUCTOR DEVICE AND STRUCTURE THEREFOR" U.S. patent application Ser. No. 15/242,830, having a common assignee, and inventor Tsutomu Murata which is filed concurrently herewith and which is hereby incorporated herein by reference.

BACKGROUND OF THE INVENTION

The present invention relates, in general, to electronics, and more particularly, to semiconductors, structures thereof, and methods of forming semiconductor devices.

In the past, the semiconductor industry utilized various methods and structures to form semiconductor devices to control linear vibration motors. In some cases the circuits would drive the linear vibration motor to an excessive extent and may cause the weight of the linear vibration motor in the case of the motor. When the weight the case, it often caused an audible noise and also may have interrupted the operation of the linear vibration motor. In some cases, the frequency of the drive signal used to drive the linear vibration motor may have been different from the frequency for which the linear vibration motor was designed. This could also undesirable audible noise or in some cases may reduce the effectiveness or efficiency of operation. In some cases, it may have taken a longer time than desired to stop the vibration of the LRA.

Accordingly, it is desirable to have a circuit and/or method that reduces the occurrence of the weight hitting the case, or that drives the linear vibration motor a frequency closer to the design frequency of the linear vibration motor, or that provides more efficient operation or that can reduce the time required to stop the LRA.

Figure 1:
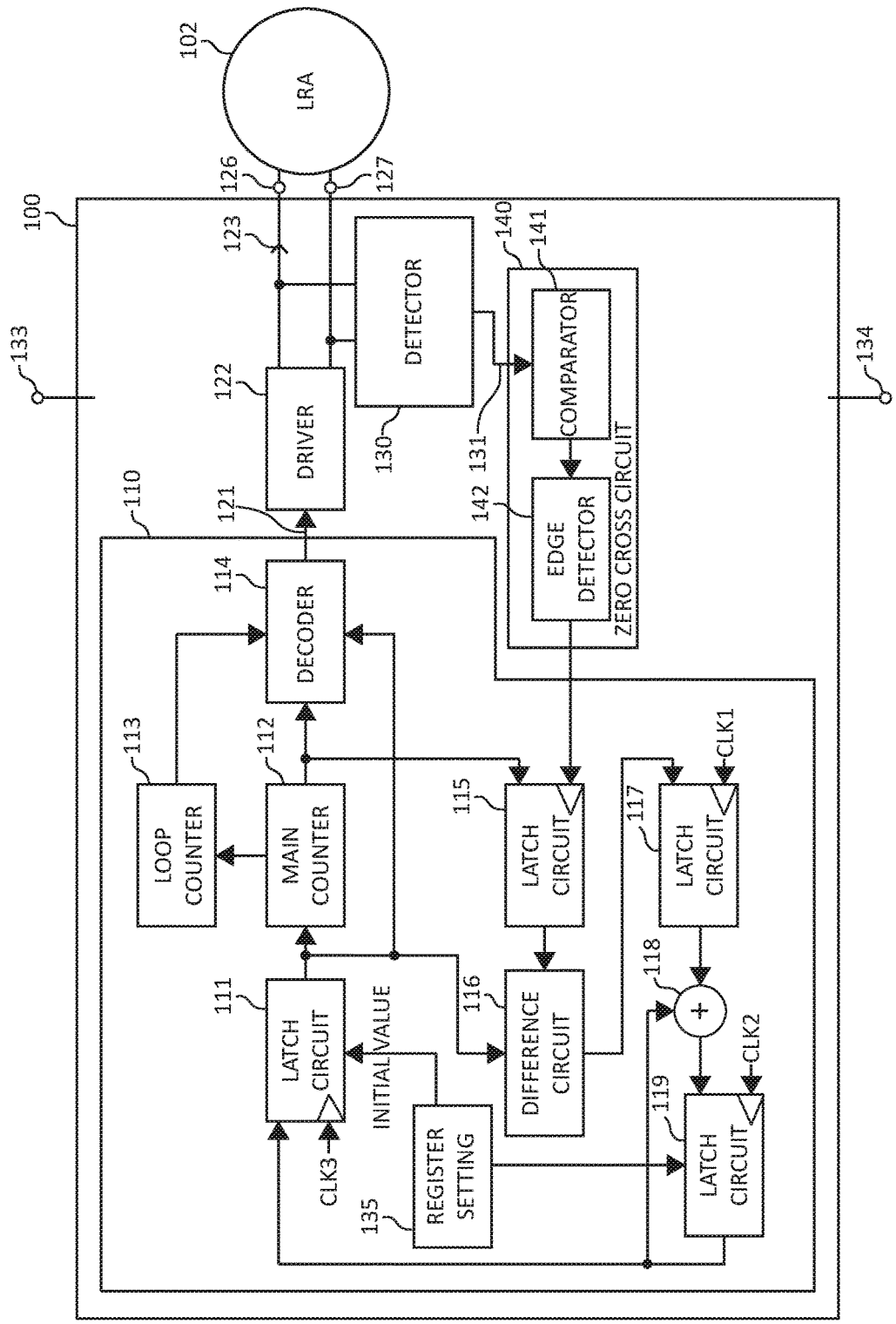
FIG. 1 schematically illustrates an example of a portion of an embodiment of a drive control circuit for controlling a linear vibration motor (LRA) in accordance with the present invention.

For simplicity and clarity of the illustration(s), elements in the figures are not necessarily to scale, some of the elements may be exaggerated for illustrative purposes, and the same reference numbers in different figures denote the same elements, unless stated otherwise. Additionally, descriptions and details of well-known steps and elements may be omitted for simplicity of the description. As used herein current carrying element or current carrying electrode means an element of a device that carries current through the device such as a source or a drain of an MOS transistor or an emitter or a collector of a bipolar transistor or a cathode or anode of a diode, and a control element or control electrode means an element of the device that controls current through the device such as a gate of an MOS transistor or a base of a bipolar transistor. Additionally, one current carrying element may carry current in one direction through a device, such as carry current entering the device, and a second current carrying element may carry current in an opposite direction through the device, such as carry current leaving the device. Although the devices may be explained herein as certain N-channel or P-channel devices, or certain N-type or P-type doped regions, a person of ordinary skill in the art will appreciate that complementary devices are also possible in accordance with the present invention. One of ordinary skill in the art understands that the conductivity type refers to the mechanism through which conduction occurs such as through conduction of holes or electrons, therefore, that conductivity type does not refer to the doping concentration but the doping type, such as P-type or N-type. It will be appreciated by those skilled in the art that the words during, while, and when as used herein relating to circuit operation are not exact terms that mean an action takes place instantly upon an initiating action but that there may be some small but reasonable delay(s), such as various propagation delays, between the reaction that is initiated by the initial action. Additionally, the term while means that a certain action occurs at least within some portion of a duration of the initiating action. The use of the word approximately or substantially means that a value of an element has a parameter that is expected to be close to a stated value or position. However, as is well known in the art there are always minor variances that prevent the values or positions from being exactly as stated. It is well established in the art that variances of up to at least ten percent (10%) (and up to twenty percent (20%) for some elements including semiconductor doping concentrations) are reasonable variances from the ideal goal of exactly as described. When used in reference to a state of a signal, the term "asserted" means an active state of the signal and the term "negated" means an inactive state of the signal. The actual voltage value or logic state (such as a "1" or a "0") of the signal depends on whether positive or negative logic is used. Thus, asserted can be either a high voltage or a high logic or a low voltage or low logic depending on whether positive or negative logic is used and negated may be either a low voltage or low state or a high voltage or high logic depending on whether positive or negative logic is used. Herein, a positive logic convention is used, but those skilled in the art understand that a negative logic convention could also be used. The terms first, second, third and the like in the claims or/and in the Detailed Description of the Drawings, as used in a portion of a name of an element are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein. Reference to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but in some cases it may. Furthermore, the particular features, structures or characteristics may be combined in any suitable manner, as would be apparent to one of ordinary skill in the art, in one or more embodiments.

The embodiments illustrated and described hereinafter suitable may have embodiments and/or may be practiced in the absence of any element which is not specifically disclosed herein.

DETAILED DESCRIPTION OF THE DRAWINGS

FIG. 1 schematically illustrates an example of an embodiment of a portion of a drive control circuit 100 that may be configured to control a linear vibration motor (LRA) 102. Circuit 100 may receive a supply voltage for operating the elements of circuit 100 between a voltage input 133 and a voltage return 134. Input 133 may be configured to receive the operating voltage from a power supply and input 134 may be configured to connect to the common reference voltage of the power supply such as for example a ground reference.

Figure 2:
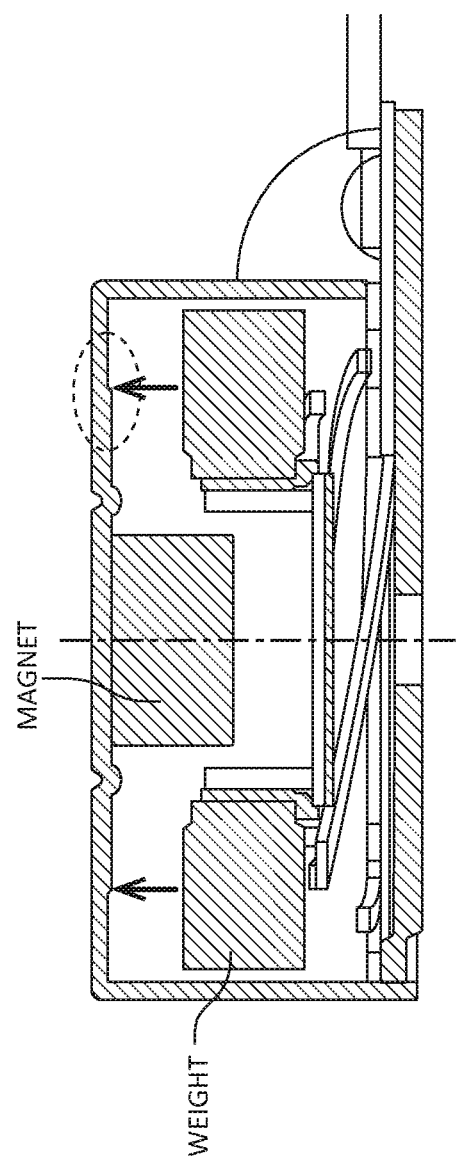
FIG. 2 illustrates in a general manner, a cross-sectional view of a non-limiting example of a linear vibration motor that may be suitable for use as an LRA for the circuit of FIG. 1 in accordance with the present invention.

FIG. 2 illustrates in a general manner, a cross-sectional view of a non-limiting example of a linear vibration motor that may be suitable for use as LRA 102 of FIG. 1. The linear vibration motor (LRA) may include a stator and a vibrator and in some embodiments may include a weight. For example, the magnet may be viewed as the stator and the mechanism to which the coil is attached may be considered the vibrator. Drive control circuit 100 may be configured to supply a drive current to the linear vibration motor (LRA) to cause the weight to oscillate up and down as illustrated by the arrows. Those skilled in the art will appreciate that other linear vibration motors may also be suitable for LRA 102.

Referring back to FIG. 1, drive control circuit 100 may have an embodiment that may include a drive signal generating circuit or drive circuit 110, a driver circuit 122, an induced voltage detector circuit or detector circuit 130, and a zero cross detection circuit or zero cross circuit 140. Circuit 122 may have an embodiment of an H-Bridge driver. Drive signal generating circuit 110 have an embodiment that may include a latch circuit 111, a main counter 112, a loop counter 113, a decoder circuit 114, another latch circuit 115, a difference calculating circuit or difference circuit 116, another latch circuit 117, a summing circuit 118, and another latch circuit 119. Circuits 110-111, 114, 116-119, and counters 112-113 may have embodiments that receive operating power between input 113 and return 134. An embodiment of drive circuit 114 may be configured to generate a drive signal 121. In some embodiments, drive signal 121 may be formed to cause LRA 102 to vibrate. In response to signal 121, circuit 122 may be configured to form a drive current 123 that may be delivered to LRA 102. Circuit 100 may be configured to form current 123 to include a positive polarity of current 123 that flows from output 126 through LRA 102 and into output 127, and may also include a negative polarity of current 123 that flows into output 126 from output 127 through LRA 102. Circuit 100 may be configured to generate drive current 123 in response to drive signal 121 generated by circuit 110 and then supply the thus generated drive current 123 to LRA 102.

Figure 3:
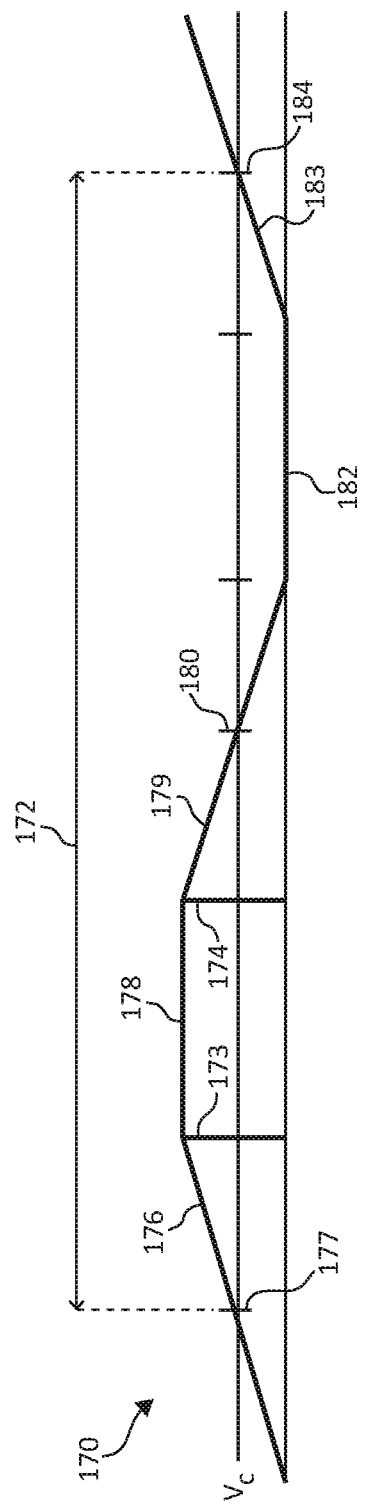
FIG. 3 is a graph having plots that illustrate some signals that may be formed by the circuit of FIG. 1 in accordance with the present invention.

FIG. 3 is a graph having a plot 170 that graphically illustrates in a generalized manner a non-limiting example embodiment of a waveform of the BEMF signal, or alternately a signal that may be representative of the BEMF signal, formed at output 127 relative to output 126 for a cycle 172 of current 123 that may be formed by an embodiment of circuit 100 in response to drive signal 121. For example, the plot 170 may be a non-limiting example of an embodiment of a detect signal 131 from detector 130. The abscissa indicates time and the ordinate indicates increasing value of the illustrated signal.

Assume for example that plot 170 is a signal that swings from substantially a power supply voltage, such as for example a voltage close to a Vcc voltage, to a voltage that is substantially a common return voltage, such as for example a ground voltage. Also assume that there is a center voltage, such as for example a common mode voltage or a reference voltage, substantially centered to the two voltage levels as illustrated by the centerline of plot 170. Thus, the signal of plot 170 and the signal that forms plot 170 swings around that center voltage, such as the level illustrated in a general manner by the centerline in plot 170. Since plot 170 and the signal move around this center voltage (Vc), when plot 170 or the signal thereof crosses that center voltage it is regarded as a zero crossing or a substantially zero crossing of that signal or of plot 170. Those skilled in the art will appreciate that other circuits may form the signal that is representative of the BEMF signal to have other reference voltages other than the common return voltage reference and may form the zero crossings at other voltage levels. For example, the centerline may be substantially a ground voltage and the signal may signal may swing above and below that ground value such as between a positive supply voltage and a negative supply voltage. Thus, plot 170 is a general representation of the BEMF signal.

An embodiment of cycle 172 may occur between two negative-to-positive zero crossings of the BEMF signal, such as for example between zero crossings 177 and 184. An example of cycle 172 begins as the negative-to-positive transition of the BEMF signal crosses the centerline such as for example at a zero crossing 177. As used herein, the term "substantially zero crossing" or the term "zero crossing" means that the value of the signal may be plus or minus ten percent (10%) of the cycle prior to or after the actual zero crossing of the signal. The plus or minus ten percent means ten percent of the cycle in time or alternately in radians. Additionally, as used herein, the term "substantially zero crossing" has the same meaning of plus or minus ten percent regardless of any other definition of the word "substantially" that may be used herein. An upwardly sloped portion or positive slope portion 176 of the BEMF signal illustrates the value of the BEMF signal rising from a negative value toward a positive value, such as for example after the end of driving LRA 102 with a negative value of current 123 and before driving LRA 102 with a positive value of current 123. The increasing portion of plot 172 after zero crossing 176 illustrates that the BEMF signal has a positive value and is becoming more positive. A substantially horizontal portion 178 of plot 170 that is above the center line represents an interval in which circuit 100 may drive LRA 102 with a positive value of current 123. The portion 178 results from current 123 flowing into LRA 102. Portions 173 of plot 170 illustrates that in some embodiments the BEMF signal formed by LRA 102 may not occur while circuit 100 is driving LRA 102, and the portion 174 illustrates that the BEMF signal from LRA 102 may return upon circuit 100 terminating driving LRA 102. A downwardly sloped portion or negative sloped portion 179 illustrates the value of the BEMF signal after termination of driving LRA 102 with the positive value of current 123 and before driving LRA 102 with a negative value of current 123. The BEMF signal is becoming less positive as portion 179 decreases from portion 178 to a positive-to-negative zero crossing 180, and the BEMF signal becomes negative for the portion of plot 170 below zero crossing 180. A substantially horizontal portion 182 that is below the centerline illustrates an interval in which circuit 100 may drive LRA 102 with a negative value of current 123. Portion 182 results from circuit 100 driving LRA 102 and in some embodiments the BEMF signal from LRA 102 may not occur during this portion 182. A positive or upwardly sloped portion 183 illustrates the value of the BEMF signal after termination of driving LRA 102 with the negative value of current 123 and before again driving LRA 102 with another positive value of current 123. The BEMF signal is becoming less negative as portion 183 increases from portion 182 to zero crossing 184, and the BEMF signal becomes positive for the portion of plot 170 above zero crossing 184. However, cycle 172 ends at zero crossing 184. A cycle of the BEMF signal resulting from current 123 may be defined to start and end at different points of the waveform of the BEMF signal in other embodiments. Portion 183 may be similar to portion 176.

The sloped portions 176, 179, and 183 of cycle 172 are formed by the voltage formed by LRA 102 at output 127 relative to output 126. Because drive signal 121 is not active for these sloped portions, circuit 100 is not driving current to LRA 102, thus, circuit 100 may be configured to form the output of circuit 122, or alternately outputs 126 and 127, to have a high impedance or HiZ for these sloped portions. In an embodiment, circuit 100 may be configured to drive LRA 102 with current 123 for portions 178 and 182 of cycle 172, thus a conducting portion of a cycle, and to not drive LRA 102 with current 123 for the sloped portions of cycle 172, thus, a non-conducting portion of the cycle and the outputs may have the HiZ for the non-conducting portions. The time interval for the non-conducting portion may be referred to as a HiZ interval. As will be seen further hereinafter, those skilled in the art will appreciate that an embodiment of counter 112 may be configured to count time intervals of cycle 172 while circuit 100 is forming drive signal 121 for cycle 172. In one example embodiment, counter 112 may be configured to count from 0 to 199 during cycle 172, thereby forming approximately 200 time intervals for drive signal 121 during cycle 172. Those skilled in the art will appreciate that an embodiment of circuits 112 and 113 may be configured to form cycle 172 for current 123. Circuit 100 may also have an embodiment wherein circuits 114-118 and the connections thereto may be configured to estimate the eigen frequency and to form the adjusted value for the frequency of signal 121.

Referring back to FIG. 1, detector circuit 130, may have an embodiment that may be configured to be connected to LRA 102 and detect a difference of electrical potentials at the both ends of the coil of LRA 102. Circuit 130 may be configured to be connected to outputs 126 and 127 to receive the BEMF signal formed by LRA 102. Circuit 130 may be configured to detect the BEMF signal formed between outputs 126 and 127 by LRA 102 during the time interval that circuit 100 is not driving LRA 102 with current 123, thus, the non-conducting portion of the cycle of current 123. An embodiment of circuit 130 may be connected to outputs 126 and 127 instead of directly to the coil of LRA 102. Circuit 130 may have an embodiment that may form detect signal 131 that may be representative of the BEMF signal. An embodiment of circuit 140 may be configured to detect zero crosses of the BEMF signal detected by circuit 130 or alternately to detect zero crossing of signal 131.

An embodiment of circuit 100 or alternately circuit 110 may be configured to estimate an eigen frequency for LRA 102 and to control or adjust the drive frequency or frequency of drive signal 121, thus of the frequency and the time interval or period of a cycle 172, to be as close to the estimated eigen frequency as possible. Those skilled in the art will appreciate that the eigen frequency is a natural resonant frequency of the LRA, and in some embodiments may be the fundamental of the natural resonant frequency. Circuit 100 may have an embodiment that may be configured to estimate the eigen function for LRA 102 from a detected position of the zero crossing of the back EMF voltage detected by circuit 140. Circuit 100 may be configured to adaptively vary or control the frequency of drive signal 121, thus the frequency of current 123, to be substantially the same as, or alternately close to, the estimated eigen frequency of LRA 102. In an embodiment, circuit 100 may be configured to adaptively vary or control the frequency of drive signal 121 to be no more than one-half of a percent (0.5%) greater than or less than the estimated eigen frequency. An embodiment may be configured to vary the frequency of drive signal 121 over a range of plus or minus fifty percent (50%) from a nominal value of the frequency. This function or method may be referred to as a resonant frequency search method or resonant frequency search mode and a circuit that is configured to perform the method or operate with these functions operates in this manner may be referred to as a resonant frequency search circuit. Operating in such a manner or method may be referred to as operating in a closed loop run mode.

An embodiment of circuit 110 may also include a register setting circuit 135 that may be configured to set an initial or starting value for the frequency of drive signal 201, thus, set an initial frequency for signal 121. For example, in response to circuit 100 being enabled to start forming current 123 to start vibrating LRA 102, circuit 135 may be configured to set an initial frequency for signal 121. In an embodiment, circuit 135 may be configured to supply an initial value to circuits 111 and 119 as illustrated by the initial value label. Circuit 100 may then begin operating in the resonant frequency search mode to form current 123, to determine the estimated eigen frequency for LRA 102, and to adjust the frequency of signal 121 to substantially the estimated eigen frequency. An embodiment of circuit 100 may include that during the HiZ interval of the cycle during the run mode the BEMF signal may be amplified by an amplifier of detector circuit 130 and form signal 131 that is representative of the BEMF signal. The amplified signal 131 from detector 130 may be received by comparator 141. If the BEMF signal, or the signal that is representative thereof, crosses the value of the reference signal received by comparator 141, the output of comparator 141 changes state. For example, if the BEMF signal is increasing, the output of comparator 141 may be asserted in response to the crossing, or if the BEMF signal is decreasing, the output of comparator 141 may be negated in response to the crossing, or alternately vice versa. Detector circuit 142 may detect the transitions of the output of comparator 141 and form an asserted a detection signal indicating detection of the zero crossing or substantially zero crossing, and vice versa. Circuit 204 may use the detected edges to determine the count of counter 112 and determine if the frequency of drive signal 121 needs to increase or decrease in order to be substantially the same or near to the eigen frequency of LRA 102. For example, circuit 115 may be configured to latch the value of counter 112 in response to the asserted state of circuit 142. Circuit 116 may be configured to determine the center of the latched value and compare that to a center value used for setting counter 112. The difference may be used to form a new starting value for counter 112 to change the frequency of signal 121.

Detector 130 may include an embodiment that may be configured to estimate the position of the vibrator portion of LRA 102 by monitoring the BEMF signal formed by LRA 102 during the non-conducting portion. A small value, including a zero value, of the BEMF signal may indicate that the vibrator is at rest (for example, the vibrator may be positioned in a maximum reachable point at a south pole side or in a maximum reachable point at a north pole side of LRA 102). Thus, circuit 100 may be configured to determine the estimated eigen frequency of LRA 102 in such a manner that circuit 140 may be configured to detect the timing with which the BEMF signal across the coil (such as for example the voltage between output 127 relative to output 126) crosses zero and may also be configured to measure a time interval between the thus detected zero crosses. The time interval between contiguous zero crosses may indicate a time interval of a half of a drive cycle of current 123, whereas the time interval between every other zero crossing may indicate a time interval of a full drive cycle of current 123.

Circuit 100 may include an embodiment that may be configured to detect only the timing with which the BEMF signal across the coil (signal between outputs 126 and 127 for example), or alternately signal 131, crosses zero as the BEMF signal is increasing from a negative voltage to a positive voltage during a non-conducting portion of a drive cycle, such as for example for portion 176 or 183 of cycle 172 (FIG. 3). In such a case, comparator 141 may be configured to form a negated output signal while the BEMF signal is lower than a threshold value, and comparator 141 may be configured to form an asserted output signal as the BEMF signal becomes higher than that threshold value or another threshold value. For example, comparator 141 may be configured to form a negated output signal while the output voltage of detector 130 is lower than a threshold value, whereas comparator 141 may be configured to form an asserted output signal as the output voltage of detector 130 becomes higher than a threshold value. The time interval between the asserted and negated values may be used to estimate the eigen frequency of LRA 102. For example, detector 130 and circuits 140, 115, and 116 may have an embodiment as a circuit that may be configured to receive the BEMF signal from LRA 102 and to selectively measure a first frequency of a vibration of the linear vibration motor, for example the estimated eigen frequency. Circuit 110 may be configured to responsively adjust the frequency or the time interval of the cycle of the next drive signal 121 that is used to drive LRA 102. Such operation may be referred to as the closed loop run mode. Comparator 141 may have an embodiment that is configured to operate without hysteresis, or substantially without hysteresis. Those skilled in the art will understand that there may be some unintentional offset between the inputs to comparator 141 due to process tolerances, but these are not considered as forming a hysteresis operation for comparator 141. Operating substantially without hysteresis may facilitate more accurately detecting the substantially zero crossing.

Circuit 100 may also include an embodiment that may be configured to repeat the measurement and the adjustment operations for one or more cycles of current 123, such as for example one or more consecutive cycles, so that drive control circuit 100 can continuously drive LRA 102 at substantially the estimated eigen frequency or a frequency near to the estimated eigen frequency of LRA 102. This function or method may be referred to as the resonant frequency search mode and a circuit that is configured to perform the method may be referred to as a resonant frequency search circuit. Operating in such a manner or method may be referred to as operating in the closed loop run mode.

In some embodiments, circuit 100 may be configured to operate a brake mode control method and may include associated circuits for controlling and/or performing a brake mode method. This function and related circuits and method may sometimes be referred to as a stop mode of operation or a braking mode of operation or a brake mode or a stop circuit or a brake circuit or braking circuit. For example, in response to terminating running and driving of LA102, such as a non-limiting example of terminating operation in the closed loop run mode or alternately stopping to provide positive and negative pulses of current 123 to LRA 102 to drive LRA 102 to vibrate or increase vibration, circuit 110 may be configured to control drive signal 121 to form an anti-drive signal that includes forming current 123 as pulses that have a phase that is opposite to the phase of the drive signal used to drive LRA 102 during the closed loop run mode or during an open loop run mode. Those skilled in the art will appreciate that the anti-drive waveform of current 123 may have an embodiment that may look substantially like the waveform of cycle 172 of FIG. 3. Operating in the brake mode may include forming the anti-drive signal with an anti-drive frequency and may include forming a brake mode of an anti-drive current for current 123 to have a substantially opposite phase such that the substantially opposite phase may also include conducting portions and also non-conducting portions. Circuit 122 may be configured to form a high impedance state, for example a high output impedance during portions of or substantially all of the non-conducting portions of anti-drive signal. For the brake mode, circuit 122 may be configured to form the brake mode of current 123 with an anti-drive phase that is substantially opposite to the phase used during the closed loop run mode (or during an open loop run mode) and to supply such brake mode of current 123 to LRA 102. This quickens the stopping of LRA 102. In some embodiments circuit 122 may be configured to vary the amplitude of current 123 proportionally to the amplitude of the BEMF signal received from LRA 102. As the brake mode of current 123 is applied to the coil of LRA 102, the stator may achieve a braking function to slow or to stop the motion of the vibrator or alternately to slow the speed of the stator. Circuit 100 may also have an embodiment that may be configured to adjust the frequency of the anti-drive signal to be substantially the eigen frequency of LRA 102. Adjusting the frequency of the anti-drive signal assists in reducing the amount of time needed to substantially stop LRA 102 from vibrating.

An embodiment of circuit 100 may be configured to detect that LRA 102 is substantially no longer moving. For example, circuit 110 may be configured to estimate, from the detected BEMF signal, a vibration force after the running of the linear vibration motor LRA has terminated (end of closed loop run mode or alternately open loop run mode) and to control the brake mode anti-drive signal of opposite phase based on the estimated vibration force. For a non-limiting example, if the BEMF signal lies within a predetermined voltage range, circuit 110 may be configured to determine that LRA 102 has come to a stop. In other words, it is regarded that the vibration force has become zero or less than a predetermined threshold value. When the above condition has been met, circuit 110 can be configured to stop the supply of the anti-drive signal to circuit 122. In some embodiments after the criterion has been met, the anti-drive signal for half of one full cycle may still be supplied to driver unit 122 before the supply thereof is stopped. Note that herein, the drive termination of LRA 102 means a normal drive stop (end of closed loop run mode or alternately an open loop run mode) excluding the reverse drive period required for the braking control (brake mode) and the anti-drive signal.

In some situations, the extent of vibration of a linear vibration motor may become too great and may cause the weight to hit the case of the LRA. It has been found that in some cases when the vibration of the motor becomes too great and the weight hits the case, the resonant frequency search mode may have caused the frequency of the drive signal to be greater than a designed resonant frequency of the linear vibration motor. When such occurs, the frequency of the drive signal may be far from the design frequency of the linear vibration motor and it may cause an undesirable audible noise. In some cases, the higher frequency of the drive signal can reduce the effectiveness of the operation in the brake mode.

Figure 4:
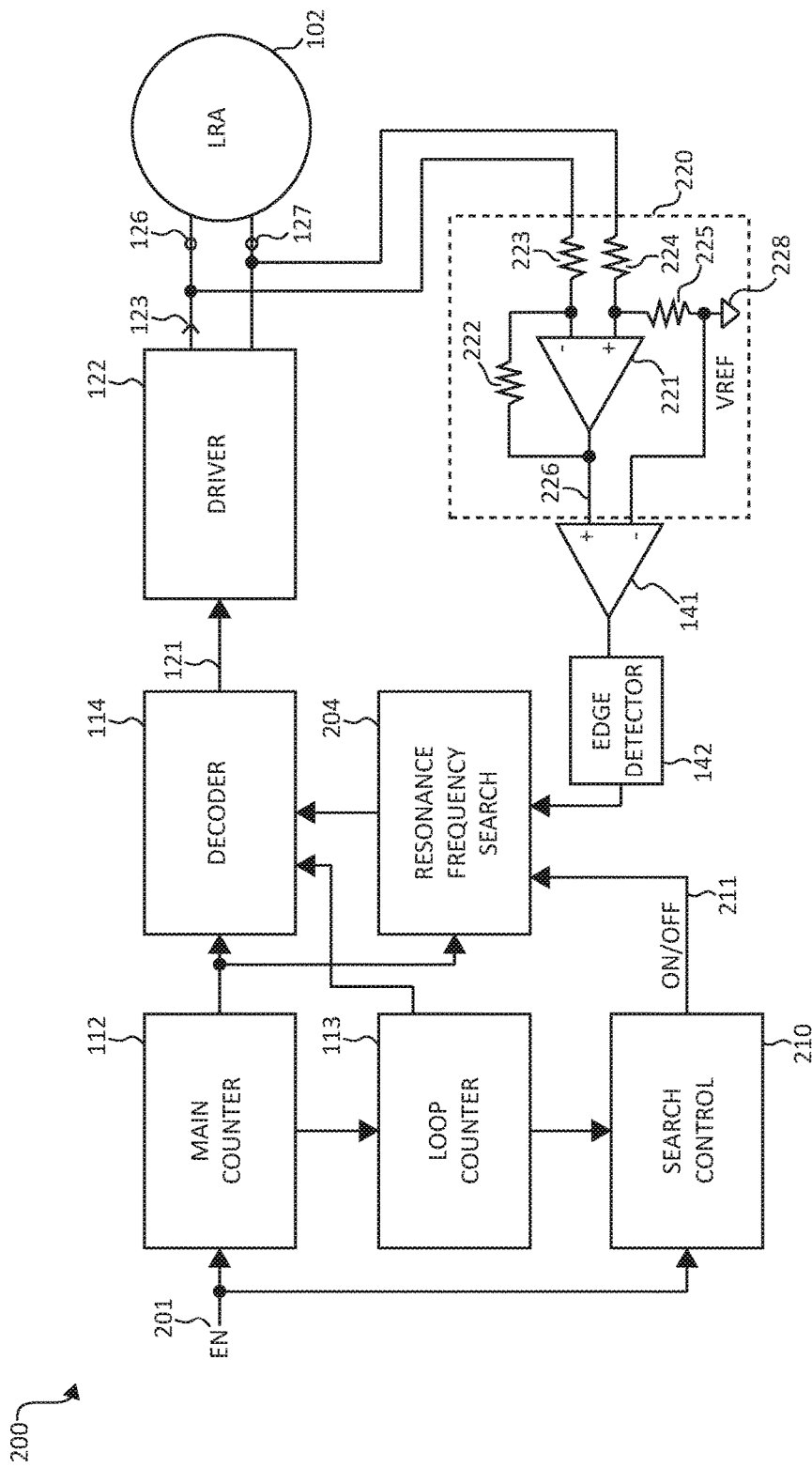
FIG. 4 schematically illustrates an example of a portion of an embodiment of a drive control circuit that may be an alternate embodiment of the circuit of FIG. 1 in accordance with the present invention.

FIG. 4 schematically illustrates an example of an embodiment of a portion of a drive control circuit 200 that is configured to control LRA 102. Circuit 200, in some embodiments, may be an alternate embodiment of circuit 100 (FIG. 1). Circuit 200 includes a resonant frequency search circuit 204. An embodiment of circuit 204 may be configured substantially the same as at least a portion of the resonant frequency search circuit of FIG. 1. For example, circuit 204 may, in some embodiments, include circuits 111, 115, 116, 117, 118, and 119, or circuits that operate substantially similarly, and these circuits may, in some embodiments, be configured in substantially the same manner as in circuit 100. Circuit 204 may be configured to operate the resonant frequency search mode in a manner substantially similar to the resonant frequency search operation described in the description of circuit 100 in FIG. 1. Circuit 200 may have an embodiment that may be configured to operate in the closed loop run mode in a manner substantially similar to circuit 100. Circuit 200 may also have an embodiment that may include an enable (EN) signal 201. In some embodiments, an asserted state of signal 201 may allow operation of circuit 200 and a negated state may stop circuit 200 from forming drive signals or anti-drive signals. Circuit 200 may include inputs 133 and 134 (FIG. 1) and receive operating power in the same manner as circuit 100. Circuit 200 may include an embodiment having an amplifier circuit 220 that may be an alternated embodiment of circuit 130 of FIG. 1. Circuit 220 may include an amplifier 221 having resistors 222-225 configured to form a gain circuit for amplifier 221. Amplifier 221 may receive a reference signal or a reference voltage (VREF) 228. In an embodiment, reference voltage 228 may form a voltage or signal at the non-inverting input of amplifier 221 that may be substantially the voltage Vc of FIG. 3. Reference voltage 228 may have a value that is referenced to the common return voltage of input 134.

An embodiment of circuit 200 may be configured to have three operating modes, the closed loop run mode, an open loop run mode, and a brake mode.

Figure 5:
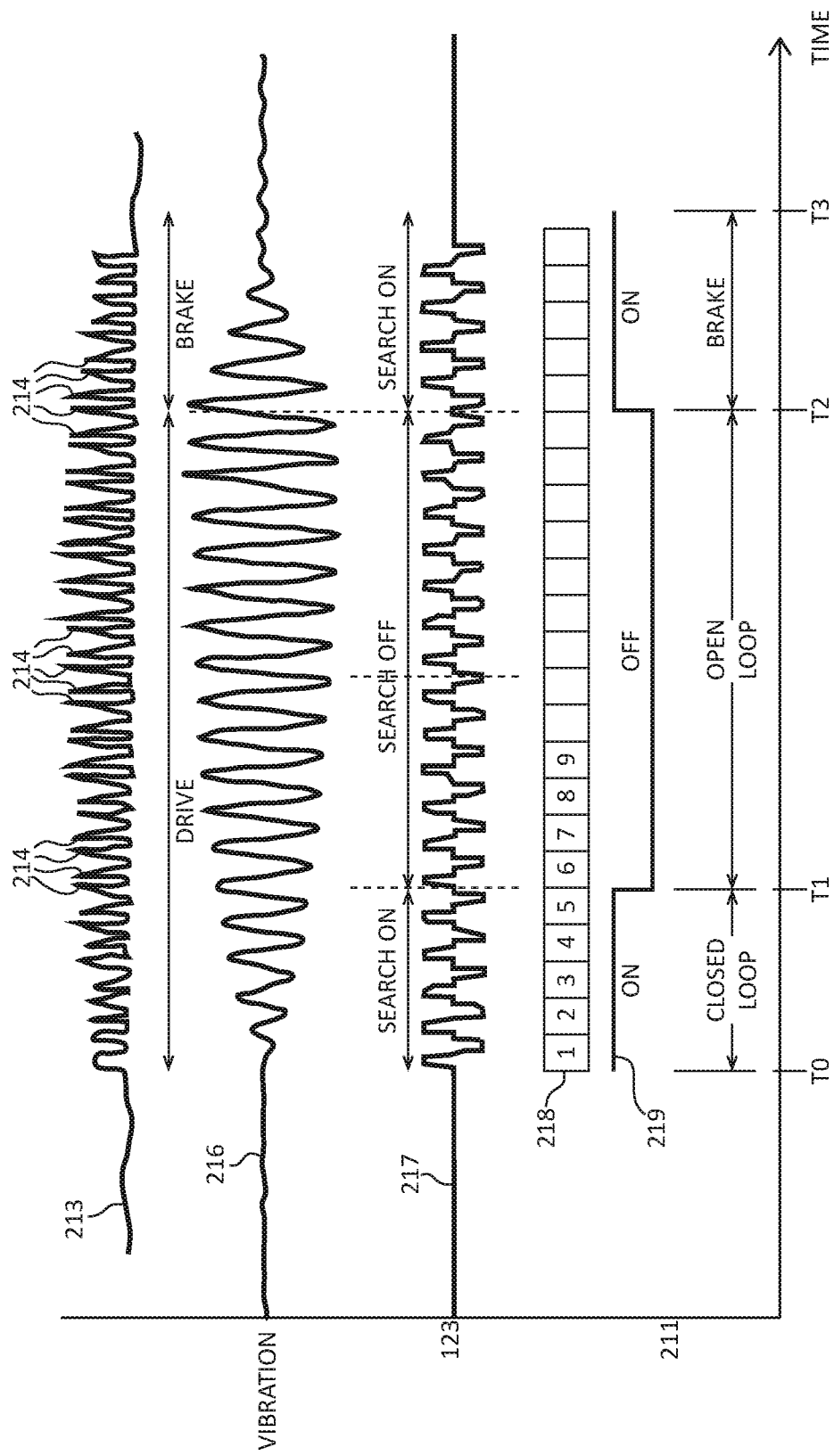
FIG. 5 is a graph having plots that illustrate some signals that may be formed by the circuit of FIG. 4 in accordance with the present invention.

FIG. 5 is a graph having plots that illustrate example embodiments of some signals that may be formed by circuit 200 during operation in the closed loop run mode, the open loop run mode, and the brake mode. The abscissa indicates time and the ordinate indicates increasing value of the illustrate signal. A plot 213 illustrates a non-limiting example embodiment of the BEMF signal formed at output 127 relative to output 126. Portions 214 illustrate in a general manner a non-limiting example of the BEMF signal during the non-conducting portions of current 123. Those skilled in the art will appreciate that the signal may have other values for the conducting portion of the cycle as illustrated in general manner by other portions of plot 213. Additionally, all of the non-conducting portions of plot 213 are not labeled for clarity of the drawings. Those skilled in the art will appreciate that plot 213 has substantially the same elements as plot 170 (FIG. 3) but illustrates more than one cycle of the BEMF signal. A plot 216 is not a signal formed or received by circuit 200 but is an illustration of the intensity of the vibration motion of LRA 102. A plot 217 illustrates one example embodiment of current 123 A plot 218 illustrates a non-limiting example of some possible values of counter 112, and a plot 219 illustrates a non-limiting example of some possible conditions of signal 211. This description has references to FIGS. 4 and 5.

In an embodiment, circuit 200 may be configured to operate in the same manner as circuit 100 operates in the closed loop run mode. Thus, in the closed loop run mode, an embodiment of circuit 200 may be configured to form drive signal 121 at a first frequency and form current 123 at the first frequency. Circuit 200 may also be configured to estimate the eigen frequency of LRA 102 and to adjust the first frequency to a frequency that is substantially the estimated eigen frequency or a frequency near to the estimated eigen frequency of LRA 102 in response to detecting the estimated eigen frequency of LRA 102. Circuit 200 may include an embodiment that operates in the closed loop run mode for a first number of cycles of drive signal 121, wherein forming drive signal 121 includes adjusting the first frequency to a second frequency that is near to the eigen frequency in response to detecting the eigen frequency of LRA 102. One non-limiting example of this type of operation is illustrated in FIG. 5 during the operation labeled closed loop. For example, an embodiment of circuit 200 may include that during the HiZ interval of the cycle during the run mode the BEMF signal may be amplified by amplifier 221 and form a signal 226 that is representative of the BEMF signal.

In some embodiments, signal 226 may be substantially similar to or alternately the same as, signal 131 (FIG. 1).

Circuit 200 may also include an embodiment that operates in an open loop run mode to drive LRA 102 to vibrate after forming the first number of drive cycles of drive signal 121 and current 123 in the close loop run mode. In the open loop run mode, circuit 200 may be configured to form drive signal 121, and current 123, at a third frequency. The third frequency may be substantially the frequency used for the last cycle of drive signal 121 during the closed loop run mode. In another embodiment, circuit 200 may be configured to form the third frequency at a frequency that is different from the second frequency that was used for the last cycle in the closed loop run mode. For example, circuit 200 may be configured to form the third frequency to be substantially the first frequency or some other frequency in other embodiments. Circuit 200 may be configured to operate at the third frequency for a second number of cycles of drive signal 121 or of current 123. In the open loop run mode, an embodiment of circuit 200 may be configured to not adjust the third frequency and to disable operation of the resonant frequency search mode. In an embodiment, circuit 200 may be configured to maintain the third frequency substantially constant during operation in the open loop run mode. Circuit 200 may be configured to maintain the third frequency substantially constant for the duration of the open loop run mode. In another embodiment, circuit 200 may be configured to change the frequency of signal 121 and current 123 during the open loop run mode to another frequency but not to the estimated eigen frequency.

Circuit 200 may further include an embodiment wherein circuit 210 may be configured to control enabling and disabling circuit 200 from operation with the resonant frequency search mode. For example, circuit 210 may be configured to enable and disable circuit 200 from adjusting the frequency of drive signal 121 in response to detecting and determining the eigen frequency of LRA 102. Circuit 210 may have an embodiment that may be configured to inhibit one of or both of detecting or determining the estimated eigen frequency. An embodiment of circuit 210 may be configured to monitor a value of loop counter 113 to determine the number of cycles of drive signal 121 or current 123 that are formed. After forming the first number of cycles in the closed loop run mode, circuit 210 may be configured to assert an ON/OFF control signal 211 to cause circuit 200 to start operation in the open loop run mode. In response to the asserted value of ON/OFF control signal 211, circuit 200 may be configured to form drive signal 121 and current 123 at the third frequency and to terminate adjusting the value of drive signal 121. For example, the ON/OFF signal may be used to inhibit circuit 204 from receiving the output of circuit 142 or to selectively force the input to circuit 204 to a value which inhibits the estimation operation. Circuit 200 may include an embodiment in which circuit 210 monitors the value of loop counter 113 to determine the number of cycles of drive signal 121 that are formed in the open loop run mode, and to negate the ON/OFF signal in response to completing the second number of cycles of drive signal 121 in the open loop run mode, such as illustrated in FIG. 5 at the end of the operation labeled "open loop". In response to completing the second number of cycles of drive signal 121, circuit 200 may be configured to begin operating in the brake mode and forming the anti-drive signal 121 to form the negative phase current signal. An embodiment may include that circuit 200 may be configured to re-enable the resonant frequency search mode and to begin adjusting the anti-drive frequency of drive signal 121 and current 123 to substantially the estimated eigen frequency while operating in the brake mode.

An embodiment may include that circuit 200 may be configured to operate in the brake mode after completing the last cycle of drive signal 121, and/or current 123, in the open loop run mode. Circuit 200 may be configured to, when operating in the brake mode, form drive signal 121, and resulting drive current 123, at an anti-drive frequency. The anti-drive signal may have a cycle substantially the same as cycle 172 illustrated in FIG. 3. The anti-drive frequency may be the third frequency and to, when operating in the brake mode, adjust the anti-drive frequency or alternately the third frequency in response to detecting and determining the estimated eigen frequency of LRA 102. In other embodiments, circuit 200 may be configured to form drive signal 121 at a different frequency in response to operating in the brake mode. For example, circuit 200 may begin operating in the brake mode and forming drive signal 121 at the first frequency and to then adjust the first frequency in response to detecting and determining the estimated eigen frequency of LRA 102. Alternately, circuit 200 may be configured to begin operating in the brake mode and forming drive signal 121 at the second frequency or some other frequency, in response to operating in the brake mode, as long as circuit 200 is configured to adjust the other frequency in response to detecting and determining the estimated eigen frequency of LRA 102. In some embodiments, circuit 200 may be configured to adjust the anti-drive frequency of signal 121 for each cycle of signal 121. Circuit 200 may have a non-limiting example embodiment wherein the operation in the brake mode is substantially the same as the brake mode operation of circuit 100 except that circuit 200 may be configured to use the third frequency to begin operating in the brake mode. An embodiment of circuit 200 may be configured to detect that LRA 102 is substantially no longer moving. For example, circuit 204 may be configured to estimate, from the detected BEMF signal, a vibration force after the running of the linear vibration motor LRA has terminated (end of closed loop run mode or alternately open loop run mode) and to terminate forming the brake mode anti-drive signal based on the estimated vibration force. In another embodiment, circuit 200 may be configured to operate in the brake mode for a desired number of cycles. In an embodiment, counter 113 may be configured to count the number of cycles in the brake mode and assert a signal that is used by circuit 200 to terminate forming anti-drive cycles. Adjusting the frequency of the drive signal when operating in the brake mode assists in reducing the amount of time required to stop the vibration of LRA 102.

By disabling the resonance frequency search operation, or operating in the open loop run mode, there is no need to analyze the back EMF voltage from the LRA with an analog-to-digital converter and no need to have a function to adjust the driving voltage with a feedback of vibration force. Thus, the size of circuit 200 can be reduced which can reduce the system cost. Additionally, even if the drive signal causes the weight of the LRA to hit the case, the frequency of the drive signal is still substantially the eigen frequency or very near thereto thus, the brake mode can begin with a drive frequency that is near to the eigen frequency. Forming brake mode to use substantially the estimated eigen frequency improves the feel of the system that uses circuit 200.

Figure 6:
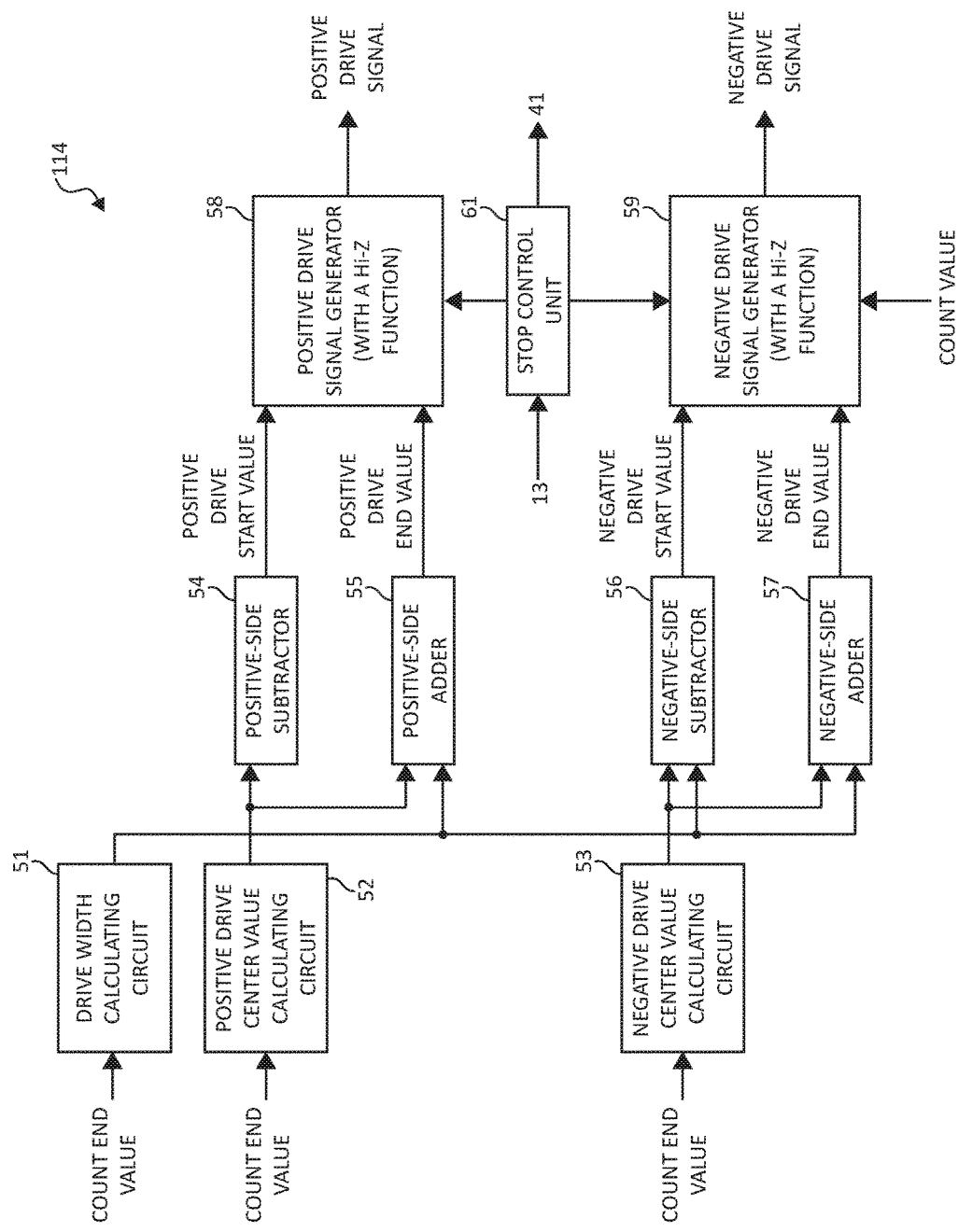
FIG. 6 schematically illustrates an example of a portion of an embodiment of a circuit that may be an alternate embodiment of a decoder circuit of FIG. 1 or FIG. 4 or FIG. 7 in accordance with the present invention.

FIG. 6 schematically illustrates an example of an embodiment of a circuit that may be an alternate embodiment of circuit 114 that is illustrated in FIGS. 1 and 4. Circuit 114 includes a brake control circuit or stop control circuit 61 that may be configured to form the high impedance state and insert the high impedance period and also may be configured to assist in forming the anti-drive signals of the brake mode.

Some embodiments described herein may be related to either or both of U.S. Pat. No. 8,736,201, issued to Tsutomu Murata on May 27, 2014 and U.S. Pat. No. 8,829,843, issued to Tsutomu Murata on Sep. 9, 201, both of which are hereby incorporated herein by reference.

From all the foregoing, one skilled in the art will appreciate that an embodiment of a semiconductor device may include a circuit for controlling a linear vibration motor that may comprise:

a first circuit, such as for example circuit 110, configured to form a drive signal (121) to control a frequency of a drive current, such as for example current 123, through the linear vibration motor;

a second circuit, such as for example circuit 204, configured to selectively measure a first frequency of a vibration of the linear vibration motor;

the circuit, such as for example either of circuits 100 or 200, configured to operate in a closed loop run mode and form the drive current at a first frequency and to adjust the first frequency to a second frequency that is substantially the frequency of the vibration of the linear vibration motor in response to a difference between the first frequency and the frequency of the vibration of the linear vibration motor;

the circuit configured to operate in the closed loop run mode for a first number of cycles of one of the drive current or the drive signal;

the circuit configured to operate in an open loop run mode for a second number of cycles of one of the drive current or the drive signal in response to an end of the first number of cycles, the circuit configured to form the drive current at a substantially fixed frequency for the second number of cycles, the drive current having a first phase; and the circuit configured to operate in a brake mode and to form the drive current with a second phase that is opposite to the first phase in response to expiration of the second number of cycles, the circuit configured to selectively measure a second frequency of a vibration of the linear vibration motor while operating in the brake mode, to form the drive current with a third frequency and to adjust the third frequency to be substantially the second frequency of the vibration of the linear vibration motor.

An embodiment may include that the circuit may be configured to selectively disable the second circuit and to not measure the frequency of the vibration of the linear vibration motor in response to the end of the first number of cycles of the drive current.

In another embodiment, the circuit may be configured to selectively enable the second circuit and to measure the frequency of the vibration of the linear vibration motor in response to the end of the second number of cycles.

The circuit may have an embodiment that may include a counter configured to count cycles of the drive signal, wherein the circuit is configured to selectively enable operation in the open loop run mode in response to the counter counting the first number of cycles.

An embodiment may include that the circuit may be configured to selectively enable operation in the brake mode in response to the counter counting the second number of cycles. Another embodiment may include that the circuit may be configured to selectively terminate operation in the brake mode in response to the counter counting a third number of cycles.

Those skilled in the art will appreciate that a circuit for controlling a linear vibration motor may comprise:

a first circuit, such as for example a circuit 110, configured to form a drive signal to control a frequency of a drive current through the linear vibration motor to cause a vibration of the linear vibration motor, the drive current having a first phase;

a second circuit, such as for example circuit 204 or portions of circuit 110, configured to selectively measure a frequency of a vibration of the linear vibration motor; and the circuit configured to form the drive current with a first frequency and a second phase that is opposite to the first phase to slow the vibration of the linear vibration motor, the circuit configured to selectively enable the second circuit to measure the frequency of the vibration of the linear vibration motor and to adjust the first frequency to a third frequency that is substantially the frequency of the vibration of the linear vibration motor in response to a difference between the first frequency and the frequency of the vibration of the linear vibration motor.

An embodiment of the circuit may be configured to determine an intensity of the vibration of the linear vibration motor and to terminate forming the drive current in response to the intensity of the vibration being less than a vibration threshold value.

In an embodiment, the circuit may be configured to not adjust the first frequency during other portions of the drive current.

An embodiment of the second circuit may include a resonant frequency search circuit configured to estimate a frequency of a back EMF signal received from the linear vibration motor.

In an embodiment, the resonant frequency search circuit may be configured to measure a time between to two negative to positive zero crossing transitions of the back EMF signal and estimate an eigen frequency of the linear vibration motor.

The circuit may have an embodiment that may include a detector circuit configured to receive the back EMF signal from the linear vibration motor, and includes a zero crossing circuit configured to detect zero crossings of the back EMF signal.

Those skilled in the art will appreciate that a method of forming a semiconductor device may comprise:

configuring a circuit of the semiconductor device to form a drive signal to form a drive current to apply to a linear vibration motor;

configuring the circuit to form an estimate of an eigen frequency of the linear vibration motor;

configuring the circuit to form the drive signal at a drive frequency and a first phase and configuring the circuit to adjust the drive frequency to a first frequency that is substantially the estimate of the eigen frequency of the linear vibration motor; and configuring the circuit to form an anti-drive signal at an anti-drive frequency and a second phase that is substantially opposite to the first phase, and configuring the circuit to adjust the anti-drive frequency of the anti-drive signal to another frequency that is substantially the estimate of the eigen frequency of the linear vibration motor.

An embodiment of the method may include configuring the circuit estimate the eigen frequency for each cycle of the anti-drive signal and to adjust the anti-drive frequency for each cycle of the anti-drive signal.

In another embodiment the method may include configuring the circuit to selectively enable adjusting the drive frequency to substantially the estimate of the eigen frequency for a first number of cycles of the drive signal and to form the drive frequency at a substantially constant frequency for a second number of cycles of the drive signal wherein the second number of cycle is subsequent to the first number of drive cycles.

An embodiment may include configuring a counter to count cycles of drive signal to determine the first and second number of drive cycles.

Another embodiment may include configuring the circuit to selective enable the circuit to estimate the eigen frequency in response to forming the anti-drive signal.

In an embodiment, the method may include configuring the circuit to measure a time between multiple zero crossings of a back EMF signal received from the linear vibration motor.

The method may have an embodiment may include configuring the circuit to receive a back EMF signal from the linear vibration motor.

An embodiment may include configuring the circuit to measure the time between multiple zero crossings of the back EMF signal and use the time between multiple zero to estimate the eigen frequency of the linear vibration motor.

Figure 7:
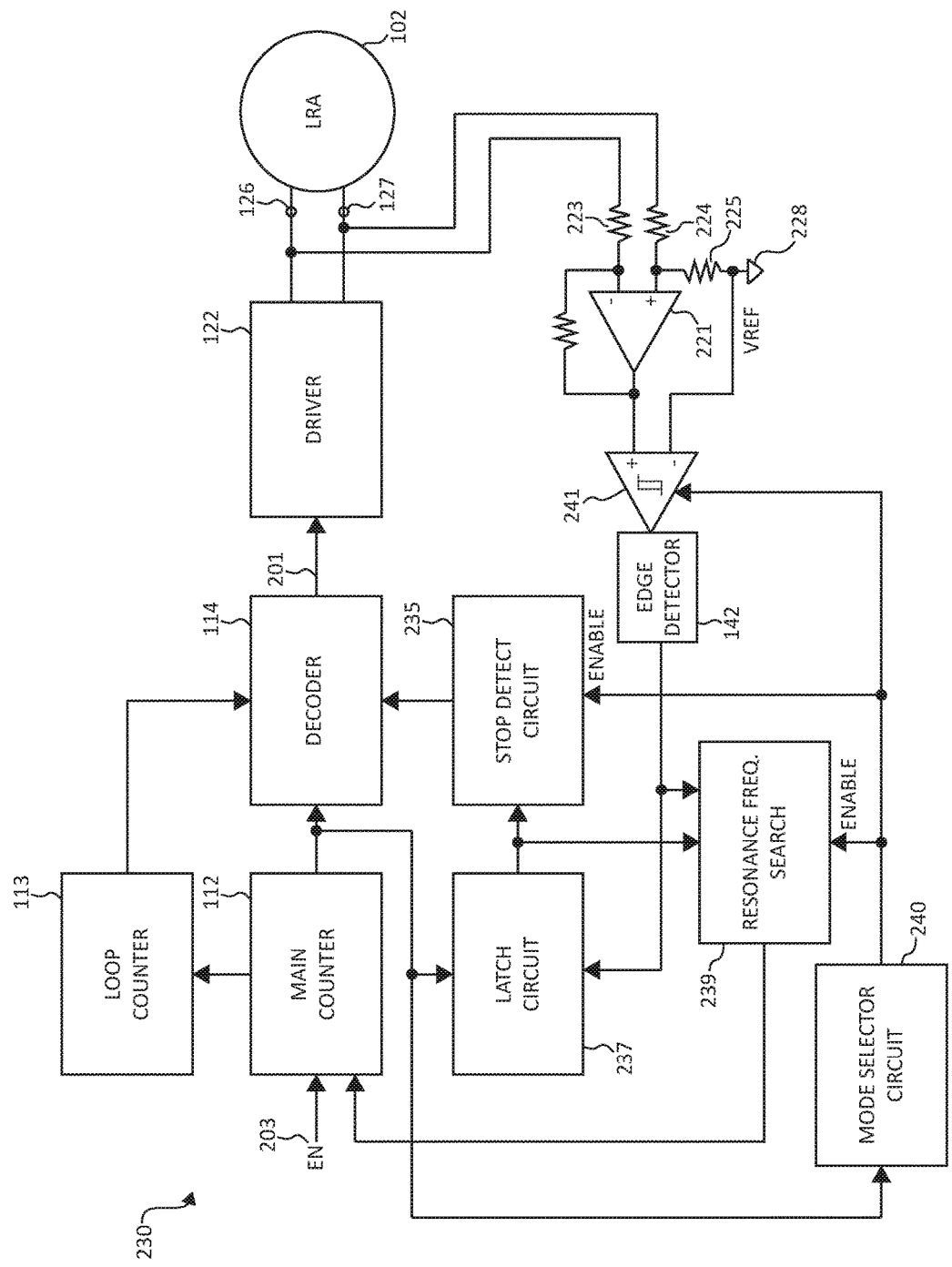
FIG. 7 schematically illustrates an example of an embodiment of a portion of a drive control circuit may be an alternate embodiment of the drive control circuit of FIG. 1 or FIG. 4 in accordance with the present invention.

FIG. 7 schematically illustrates an example of an embodiment of a portion of a control circuit 230 that is configured to control LRA 102. Circuit 230, in some embodiments, may be an alternate embodiment of circuit 100 (FIG. 1) or alternately of circuit 200 of FIG. 4. Circuit 230 may include a resonant frequency search circuit 239. An embodiment of circuit 239 may be configured substantially the same as and operate substantially the same as at least a portion of the resonant frequency search circuit of FIG. 1 or substantially the same as at least a portion of resonant frequency search circuit 204 of circuit 200 (FIG. 4). For example, circuit 239 may, in some embodiments, include circuits 111, 115, 116, 117, 118, and 119 configured in the substantially the same manner as configured for circuit 100 (FIG. 1) and may be configured to operate in a manner substantially similar to or substantially the same as the operation of the resonant frequency search mode described in the description of FIG. 1 or alternately substantially the same as at least a portion of the resonant frequency search mode formed by circuit 200 of FIG. 4. Circuit 239 may also include an embodiment that may be selectively enabled to operate circuit 230 in the resonant frequency search mode and to selectively disable operation in the resonant frequency search mode. Circuit 230 may have an embodiment that may include a stop detect circuit 235, a counter latch circuit 237, and a mode selector circuit 240. In some embodiments, circuit 237 may be substantially similar to and operate substantially the same as circuit 115 of FIG. 1. Circuit 240 may have an embodiment that may be substantially similar to and operate substantially the same as circuit 210 of FIG. 4 except that circuit 240 is also configured to control the brake mode as will be seen further hereinafter.

An embodiment of circuit 230 may also include a hysteresis comparator 241. Comparator 241 may be similar to a comparator 41 and the related hysteresis circuitry, such as in FIGS. 11 and 16, as explained in U.S. Pat. No. 8,736,201, issued to Tsutomu Murata on May 27, 2014 which is hereby incorporated herein by reference. As will be seen further hereinafter, an embodiment of comparator 241 may be configured to selectively operate as a hysteresis comparator or to selectively operate as a non-hysteresis comparator.

In some systems that use an LRA, the LRA may be used to provide tactile feedback to a person that is touching the system, such as for example a touch screen of a smartphone or a tablet. For control systems that use a braking function or brake mode for controlling the LRA, it sometimes may happen that the brake signals are out of phase with vibration of the LRA, such as for example not in phase with the vibration of the moving parts of the LRA, such as for example the yoke and the weight.

Further, in some applications, a controller may set a HiZ interval during an active time of the drive signal, such as for example within the portion of the drive cycle time interval that the drive signal is to form the non-conducting portion of the cycle, and may check the vibration force of the motor by monitoring the BEMF signal during the HiZ period. If the BEMF signal received during the HiZ period is less than a threshold value, then it may be determined that the LRA has substantially ceased vibrating and the anti-drive signal during the brake mode may be terminated.

Referring back to FIG. 7, circuit 230 may include an embodiment that may be configured similarly to circuit 200 to have three operating modes, a closed loop run mode, an open loop run mode, and a brake mode as described for circuit 200. Another embodiment of circuit 230 may be configured to include a closed loop run mode and a brake mode as described for circuit 100. Thus, circuit 230 may be configured to operate in the brake mode by forming the anti-drive signal. In some embodiments, the brake mode may include adjusting the frequency of the anti-drive signal to be substantially the same as or near to the estimated eigen frequency of LRA 102.

Circuit 230 may also include an embodiment that may include a sync-brake mode that in some embodiments may be different than the brake mode of either of circuits 100 or 200; however, the sync-brake mode of operation and any of the related circuits of circuit 230 may be used as a portion of either of circuits 100 or 200. An embodiment of circuit 230 may be configured to form a drive signal 201 that may include all of the embodiments of signal 121 explained in the descriptions of FIGS. 1-6, and additionally, signal 201 may also include signals for the sync-brake mode of operation. An embodiment of circuit 240 may include control circuitry to operate circuit 114 to form the sync-brake mode.

Figure 8:
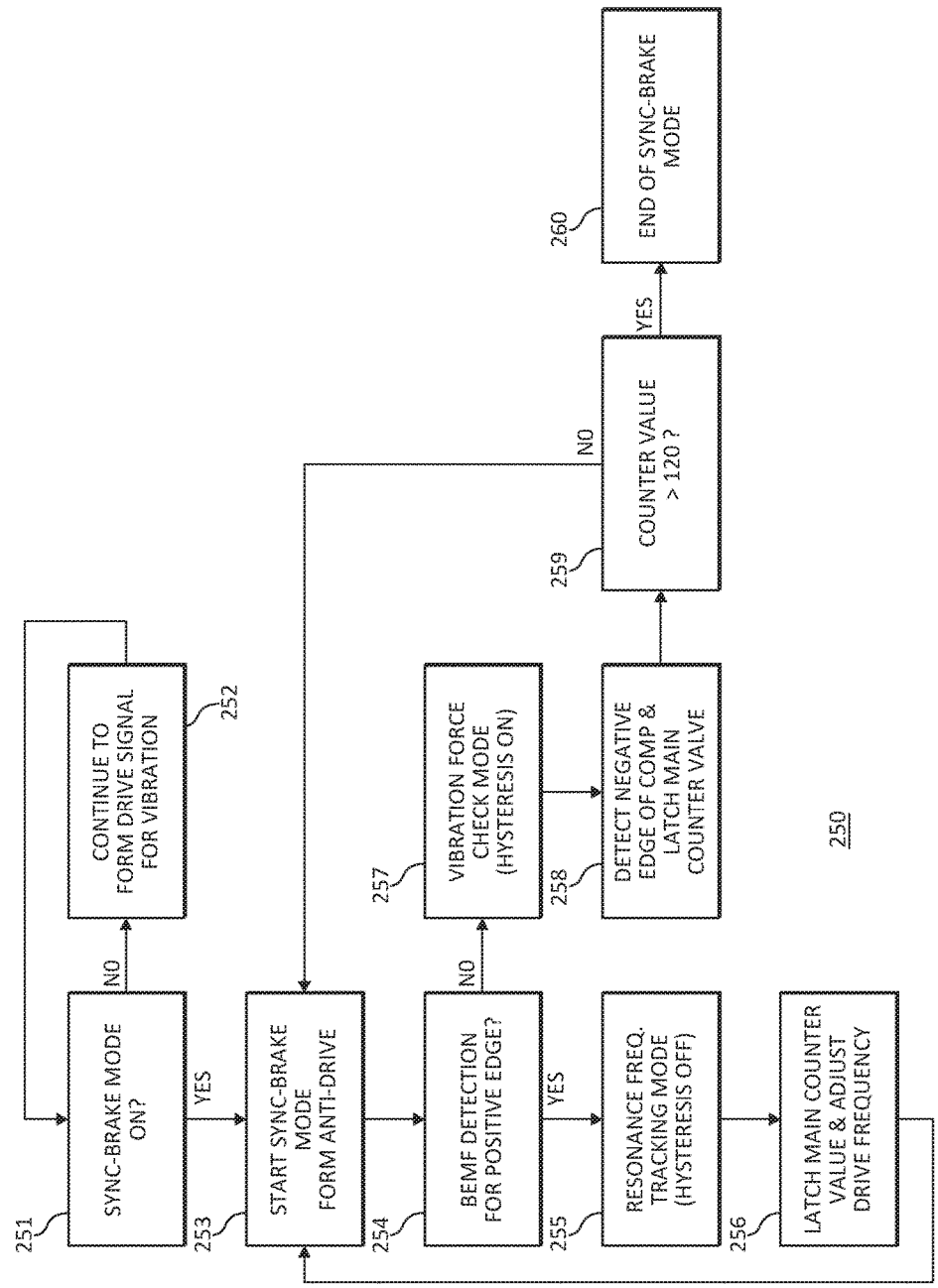
FIG. 8 illustrates in a general manner a flow chart that illustrates in a general manner an embodiment of some steps in an embodiment of a method of operation for the circuit of FIG. 7 in accordance with the present invention.

FIG. 8 illustrates in a general manner a flow chart 250 that illustrates in a general manner an embodiment of some steps in an embodiment of a method of operation for the sync-brake mode formed by one or more embodiments of circuit 230.

Figure 9:
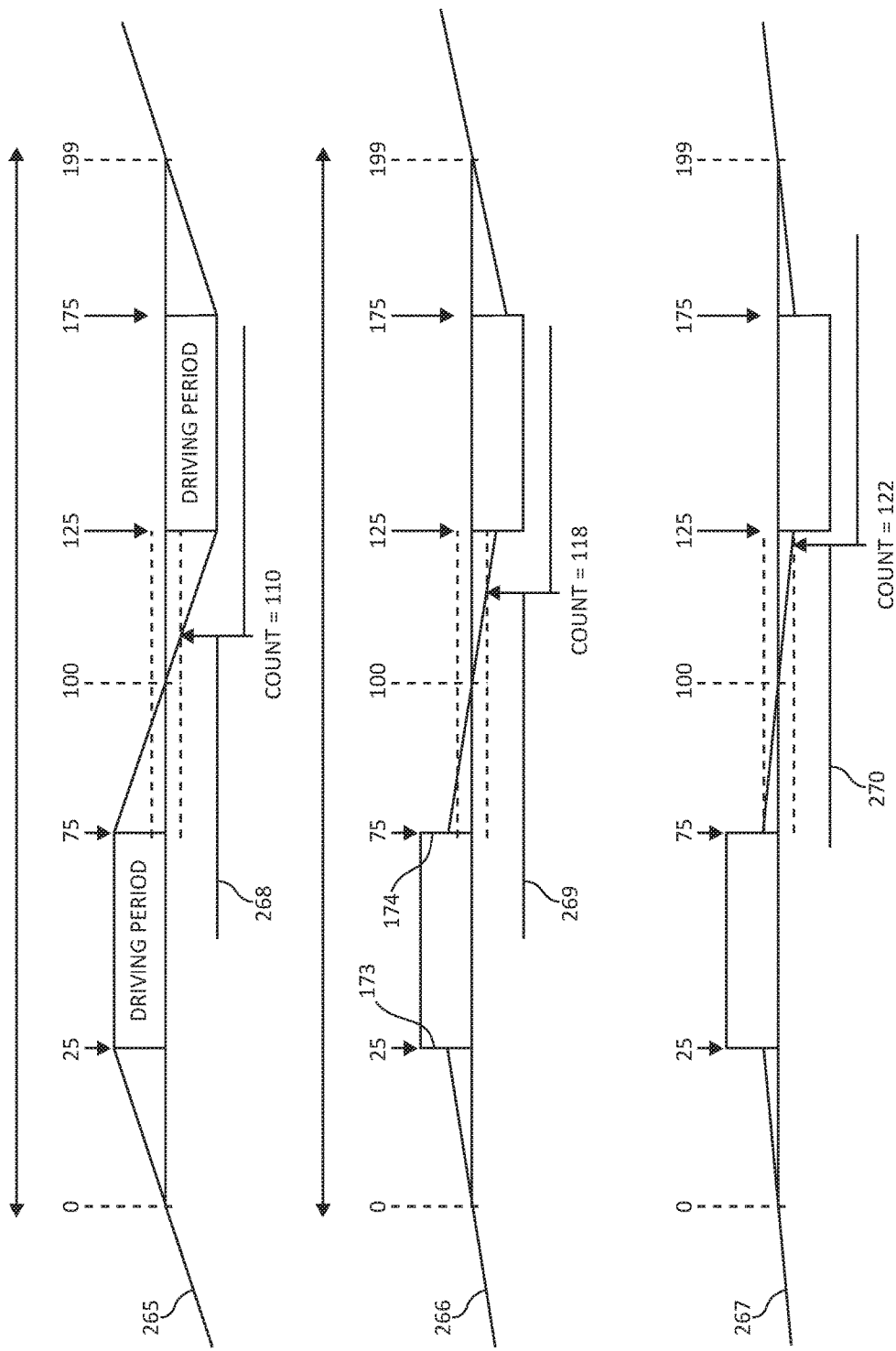
FIG. 9 is a graph having three plots that illustrate some non-limiting examples of some signals that may be formed during the operation of an embodiment of the circuit of FIG. 7 in accordance with the present invention.

FIG. 9 is a graph having three plots that illustrate some non-limiting examples of some signals that may be formed during the operation of an embodiment of circuit 230. Plots 265-267 graphically illustrate in a generalized manner some non-limiting example embodiments of different waveforms for the BEMF signal for a cycle 172 of current 123 that may be formed by a circuit 230 in response to drive signal 201. The individual elements of plots 265-267 represent the same portions of a waveform of the BEMF signal as explained in the description of plot 170 of FIG. 3, such as for example the conducting and non-conducting portions. Plots 268-270 illustrate in a general manner examples of possible states of the output of comparator 241 for the cycle illustrated by respective plots 265-267. The abscissa indicates time and the ordinate indicates increasing value of the illustrate signals. This description has references to FIGS. 7-9.

Assume for an example, that an embodiment of main counter 112 may be configured to count from 0-199 time intervals during a cycle of drive signal 201 or alternately of drive signal 121. The numbers 0-199 on plots 265-267 represent a non-limiting example of possible values for main counter 112 and possible time intervals during cycle 172 of drive signal 201.

Steps 251 and 252 of flowchart 250 illustrate a portion of a method in which an embodiment of circuit 230 operates in the run mode and does not operate in the sync-brake mode, thus, circuit 230 may be configured to operate to form drive signal 201 with a drive frequency to drive LRA 102 and cause LRA 102 to vibrate. For example, circuit 230 may be operating in either the closed loop run mode or open loop run mode.

Assume for example, that circuit 230 completes operation in the run mode (closed loop or open loop) and transitions to the sync-brake mode as illustrated at a step 253. An embodiment of circuit 230 may be configured to form the anti-drive signal for drive signal 201 with an anti-drive frequency and form current 123 having a phase that is opposite to the phase used to form current 123 during the run mode (either open or closed loop). As explained hereinbefore, an embodiment of the sloped portions of the waveform of current 123 represents a positive slope or a negative slope of the BEMF signal and the outputs of circuit 230 may have the HiZ state for these non-conducting portions of the cycle. An embodiment of circuit 230 may be configured to monitor the BEMF signal received between outputs 126 and 127 during at least a portion of the HiZ time intervals. During at least a portion of the HiZ time interval of one of either the positive slope or the negative slope, circuit 230 may be configured to operate using the resonant frequency search mode and adjust the anti-drive frequency of the anti-drive signal to substantially the estimated value of the eigen frequency of LRA 102. For example, determine the eigen frequency of LRA 102 and adjust the frequency of the anti-drive signal. During at least a portion of the time interval of an opposite one of either the positive slope or the negative slope, circuit 230 may be configured to determine if the intensity of the vibration of LRA 102 is less than a vibration threshold value then terminate the sync-brake mode in response thereto, such as for example as illustrated in steps 257- 260. For example, terminate forming the anti-drive signal to slow the vibration action of LRA 102. If the vibration force is greater than the vibration threshold value, circuit 230 may be configured to continue operating in the sync-brake mode as illustrated at steps 259 and 253.

Steps 253-256 of flowchart 250 illustrate a method of forming and controlling the anti-drive signal wherein the positive or rising slope of the waveform of current 123 may be used to determine the eigen frequency and operate using the resonant frequency search mode and adjust the frequency of the anti-drive signal. For example, circuit 230 may be configured to use the substantially zero crossings of the positive slope of the BEMF signal to determine the eigen frequency of LRA 102. An embodiment of circuit 230 may be configured to use the substantially zero crossings of only the positive slope of the BEMF signal to determine the eigen frequency of LRA 102. In response to operation using the resonant frequency search mode in the sync-brake mode, circuit 230 may be configured to selectively disable comparator 241 from operating with hysteresis and selectively enable comparator 241 to operate as a regular comparator as illustrated at step 255. Using the non-hysteresis mode when operating in the frequency search mode facilitates more accurately detecting the zero crossing or substantially zero crossing. For example, comparator 241 may be configured to detect the substantially zero crossings and circuit 237 may form a signal representing the edges of the output of comparator 241 that correspond to the substantially zero crossings of the positive slope of the BEMF signal. Circuit 230 may be configured to use these zero crossings of the positive slope of the BEMF signal to determine the eigen frequency and adjust the frequency of signal 201.

Steps 257-260 illustrate an example of a method of forming and controlling the anti-drive signal wherein the negative slope of the BEMF signal is used to measure and to detect the intensity of the vibration of LRA 102. Circuit 230 may have an embodiment that uses only the negative slope of the BEMF signal, or alternately the time interval thereof, to measure and to detect the intensity of the vibration of LRA 102. If the vibration has decrease to less than the vibration threshold level, circuit 230 may be configured to terminate forming the anti-drive signal to slow the vibration action of LRA 102. In response to operating to monitor the BEMF signal and determine the intensity of the vibration of LRA 102 in the sync-brake mode, circuit 230 may be configured to selectively enable comparator 241 to operate as the hysteresis comparator as illustrated at step 257. In one embodiment circuit 230 may be configured to detect that the intensity of the vibration has decreased to no greater than the vibration threshold value and responsively stop forming the anti-drive signal.

An embodiment of circuit 230 may include that during the HiZ interval the BEMF signal during the sync-brake mode is amplified by amplifier 221. As illustrated at step 257, circuit 230 may be configured to selectively operate comparator 241 in the hysteresis mode to detect the value of the output of amplifier 221 being greater than a reference voltage value plus a hysteresis value. As the vibrations of LRA 102 become weaker, the angle or slope of the non-conducting portion of the BEMF signal becomes smaller, thus, the count value of counter 112 will become larger as the vibration decreases. Thus, the value of counter 112 may be used to detect that the vibration has become less than the vibration threshold value. Step 258 illustrates that an embodiment of circuit 230 may be configured to capture the count or value of counter 112 in response to comparator 241 detecting the substantially zero crossing of the BEMF signal during the sync-brake mode. However, those skilled in the art will appreciate that in the hysteresis mode, circuit 230 may detect a modified zero crossing at a point other than the actual zero crossing because of the hysteresis operation of comparator 241. For example, the value of counter 112 may be captured or stored, such as for example in circuit 115, in response to the output of comparator 241 changing state or in an alternate embodiment changing from an asserted to a negated state. If the count value is no less than a threshold count value, circuit 230 may be configured to determine that the vibration of LRA 102 is less than the vibration threshold value and may be considered to have substantially stopped vibrating. For example, the value or count of main counter 112 may be less than a vibration threshold count to determine that the vibration intensity is less than the vibration threshold value. In an embodiment, if the vibration value is less than the vibration threshold value, it is detected that the vibration of LRA 102 is less than the vibration threshold value and the sync-brake mode may be terminated, such as for example the anti-drive signal to slow the vibration of LRA 102 may be terminated. In some embodiments, the anti-drive and the drive signals are both terminated. However, if the value of the counter indicates that the vibration is greater than the vibration threshold value, the sync-brake mode may still be continued as illustrated by step 259 returning to step 253 in flowchart 250.

The plots of FIG. 9 illustrate three different values of counter 112 that may occur for three different intensities of the vibration of LRA 102. Assume that an example of the count threshold value may be a count value of 120. Plots 265 and 268 illustrate that at one substantially zero crossing or the modified zero crossing of the negative slope of the BEMF signal, counter 112 may have a value of 110, thus, circuit 230 detects that the vibration intensity is large and returns to step 253 of chart 250. Plots 266 and 269 illustrate that at one substantially zero crossing or modified zero crossing of the negative slope of the BEMF signal, counter 110 may have a value of 118, thus, circuit 230 detects that the vibration intensity is still too large and returns to step 253 of chart 250. Plots 267 and 270 illustrate that at one substantially zero crossing or modified zero crossing of the negative slope of the BEMF signal, counter 110 may have a value of 122. Since the count threshold value is 120, circuit 230 detects that the vibration intensity is small and operation moves to step 260. Those skilled in the art will appreciate that because of the hysteresis operation of comparator 221 and the different slope of the non-conducting portion of the cycle, circuit 230 may assert the signal indicating the detection of the zero crossing at different places relative to the actual zero crossing. Because of the hysteresis, a less steep slope will result in asserting the detection signal later in the cycle, for example a modified zero crossing, than it will for a steeper slope of the BEMF signal, for example another modified zero crossing. For example, plot 265 has a large intensity of vibration, so the slope is steeper and the crossing point of dashed line and BEMF voltage is near zero crossing point. On the other hand, plot 267 has a small intensity, so the slope of BEMF is less and the crossing point of dashed line and BEMF voltage is far from zero crossing point, for example at a modified zero crossing. There is a relation between intensity of vibration and slope of BEMF and the hysteresis comparator detects a steeper slope quicker than a less steep slope resulting in one example of a modified zero crossing.

Thus, circuit 230 may be configured to operate in the sync-brake mode to use the resonant frequency search mode and adjust the frequency of the anti-drive signal to substantially the estimated value of the eigen frequency of LRA 102 for at least a portion of the HiZ time interval of only one of either the positive slope or the negative slope of the BEMF signal. During at least a portion of the time interval of only an opposite one of either the positive slope or the negative slope, circuit 230 may be configured to determine if the intensity of the vibration of LRA 102 is less than the vibration threshold value then terminate the sync-brake mode.

Figure 10:
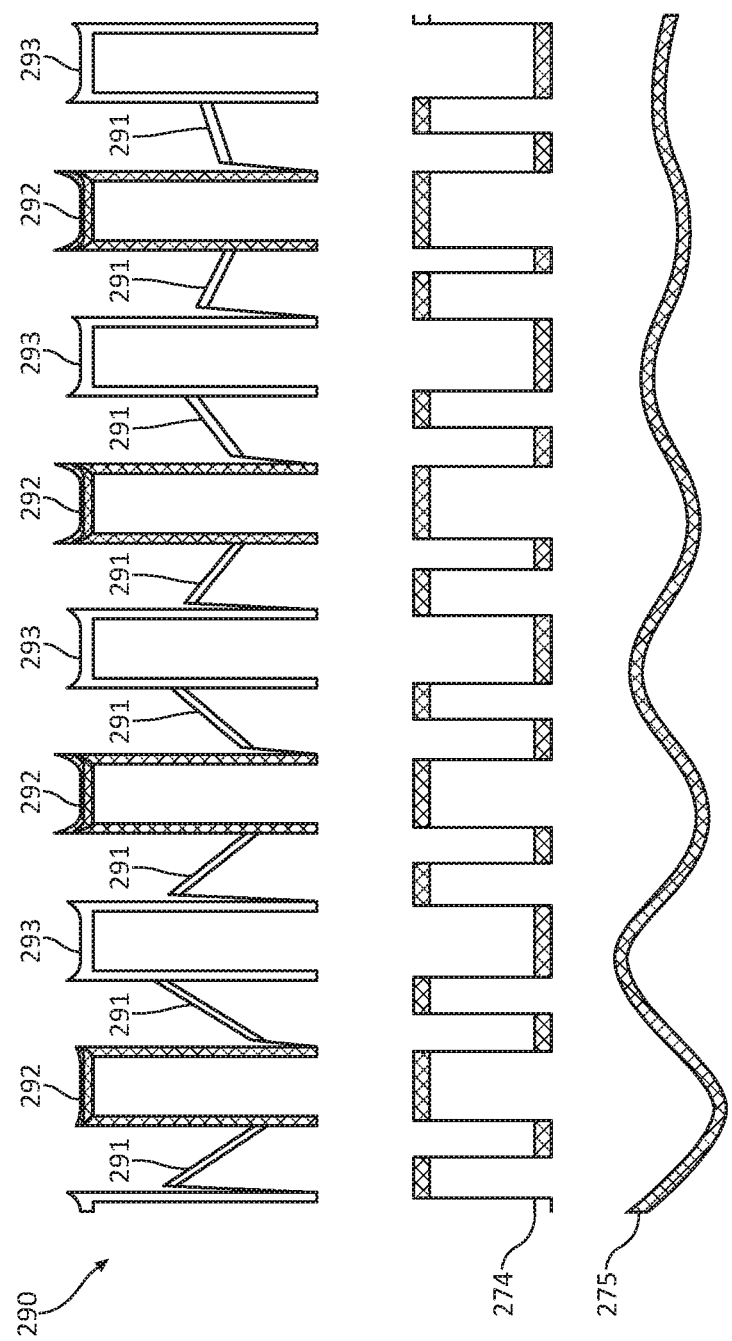
FIG. 10 is a graph having plots that illustrate another example of an embodiment of a method that may be formed by the circuit of FIG. 7 in accordance with the present invention.

FIG. 10 is a graph having plots that illustrate another example of a method for determining if the vibration of the LRA is less than the vibration threshold value and/or a method of adjusting the frequency of the anti-drive signal in response to the vibration frequency of the LRA. A plot 290 illustrates the waveform of the BEMF signal. The portions of the waveform identified in a general manner as portions 291 are the BEMF signal formed by LRA 102 such as for example the BEMF during the non-conducting portions of the cycle. Portions 292 illustrates in a general manner a portion of dive signal applied to output 127 relative to the common return voltage, such as for example a ground voltage, during the conduction portions of the cycle. Portions 292 may in some embodiments correspond to portion 178 of FIG. 3. Portions 293 illustrates in a general manner a portion of the dive signal applied to output 126 relative to the common return voltage during the conduction portions of the cycle. Portions 293 may in some embodiments correspond to portion 182 of FIG. 3. A plot 274 illustrates an example of the output of comparator 241. A plot 275 illustrates an example of the intensity of the vibration of LRA 102. As seen in plot 275, the vibration intensity decreases in response to the anti-drive signal having a frequency that is adjusted to be substantially the same as the vibration frequency of the LRA. An embodiment may include that the adjustment may be performed for substantially each cycle of the anti-drive signal of drive signal 201. Using one of the positive or the negative slope of the BEMF signal to estimate the eigen frequency and adjust the frequency of the anti-drive signal and using the other slope of the BEMF signal to determine if the vibration has decreased to less than the vibration threshold value facilitates using one cycle of the anti-drive signal to quickly reduce the vibration of the LRA as well as detecting that the vibration has substantially stopped.

Figure 11:
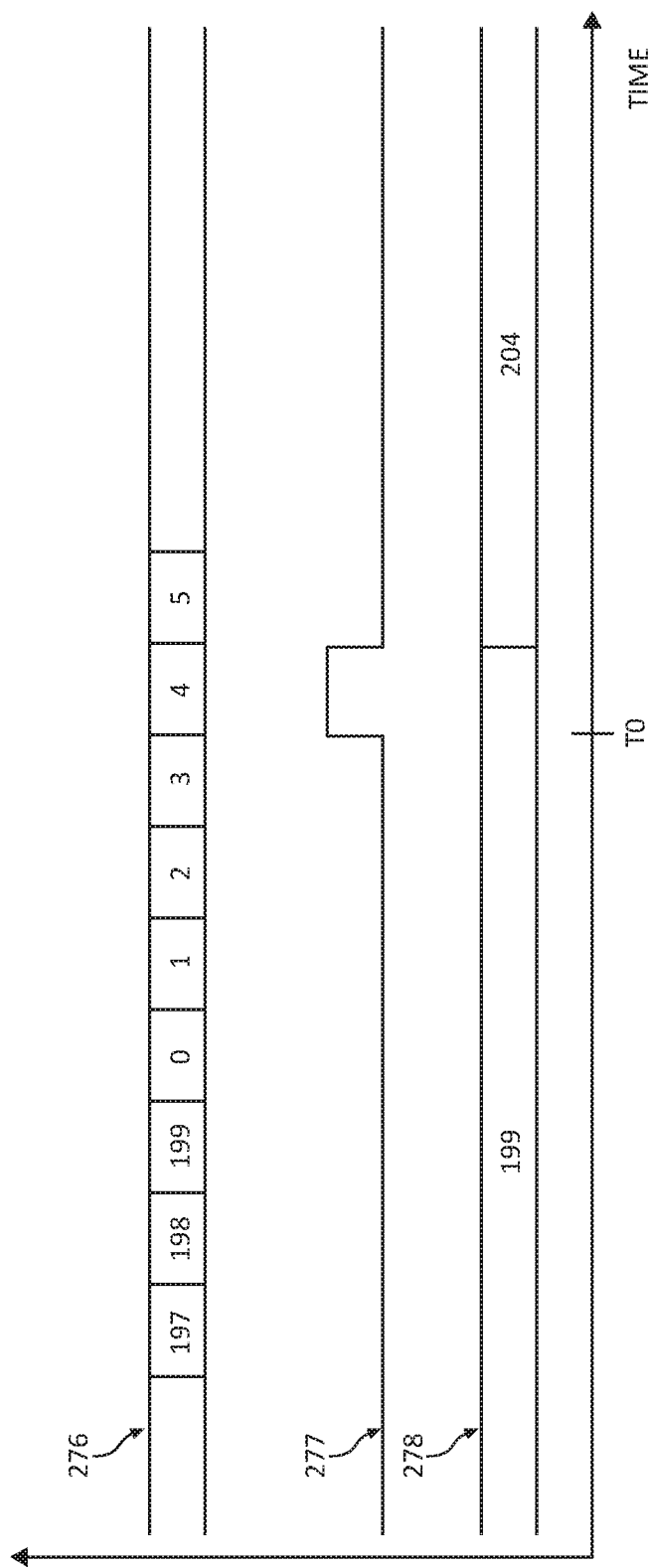
FIG. 11 is a graph having plots that illustrate an example of another embodiment of a method that might be formed by the circuit of FIG. 7 in accordance with the present invention.

FIG. 11 is a graph having plots that illustrate another embodiment of the method for adjusting a value of the anti-drive signal of drive signal 201 including using a value of main counter 112 in response to the output of comparator 241 changing state, and also operating as a non-hysteresis comparator for the method of adjusting the frequency of the anti-drive signal. A plot 276 illustrates an example of some of the count values for an embodiment of counter 112. A plot 277 illustrates an example of an embodiment of the output of an embodiment of comparator 241 when operating in the non-hysteresis mode, and a plot 278 illustrates an example of an embodiment of counter 110 being set with a new count value to adjust the frequency of the anti-drive signal. Assume for example that at a time T0, the output of comparator 241 changes state, and that counter 112 has counted to a count to 204. The count value of 204 is captured or stored substantially at time T0 and the new starting value of counter 110 is adjusted to begin counting at four (4) instead of at zero (0) to adjust for the difference between the actual value (204) of counter 110 at the end of the previous cycle and the value (199) that it should have at the end of that previous cycle.

Configuring circuit 230 to adjust the frequency in one portion of the non-driven portion of the drive current and to determine if the vibration of the LRA has decreased to less than the vibration threshold value in another portion of a different non-driven phase of the drive signal may facilitate providing a more usable vibration feedback to the user of the device incorporating circuit 230.

Figure 12:
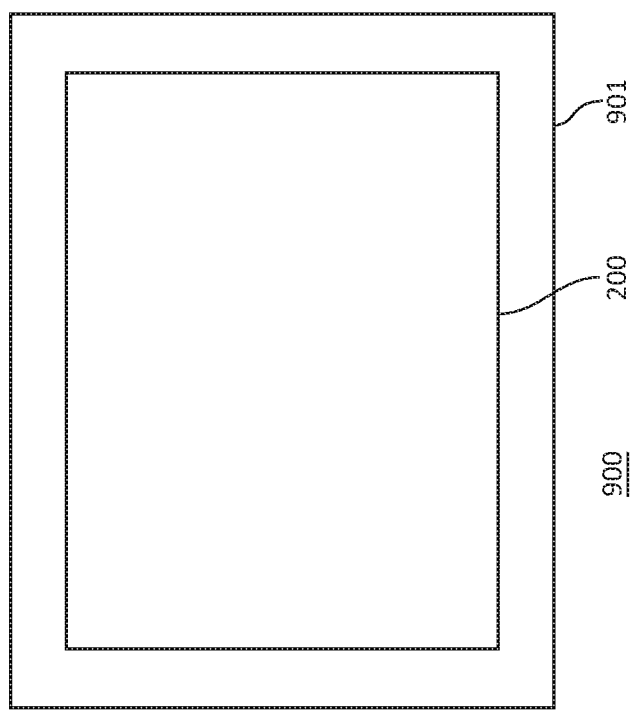
FIG. 12 illustrates an enlarged plan view of an example of a portion of an embodiment of a semiconductor device that may include at least one of the circuits of FIGS. 1, 4, 6, and/or 7 in accordance with the present invention.

FIG. 12 illustrates an enlarged plan view of a portion of an embodiment of a semiconductor device or integrated circuit 900 that is formed on a semiconductor die 901. In an embodiment, any one of circuit 100 or 200 or 230 may be formed on die 901. Die 901 may also include other circuits that are not shown in FIG. 11 for simplicity of the drawing. The device or integrated circuit 900 may be formed on die 901 by semiconductor manufacturing techniques that are well known to those skilled in the art.

Some embodiments described herein may be related to either or both of U.S. Pat. No. 8,736,201, issued to Tsutomu Murata on May 27, 2014 and U.S. Pat. No. 8,829,843, issued to Tsutomu Murata on Sep. 9, 201, both of which are hereby incorporated herein by reference.

From all the foregoing, one skilled in the art will understand that a semiconductor device including a control circuit for controlling a linear vibration motor may comprise:

a first circuit, such as for example circuit 110/114, or 122, may be configured to form a drive signal, such as for example signal 121, to control a frequency of a drive current, such as for example current 123, through the linear vibration motor;

a second circuit, such as for example circuit 239 or 221 or 224, may be configured to receive a back EMF (BEMF) signal from the linear vibration motor and to selectively measure a first frequency of a vibration of the linear vibration motor;

in some embodiments, the second circuit may have an output coupled to the first circuit to provide a frequency signal to the first circuit;

the control circuit, such as for example circuit 100 or 200 or 230, may be configured to operate in a closed loop run mode and form the drive current at a drive frequency to cause the linear vibration motor to vibrate, the control circuit configured to adjust the drive frequency to substantially the first frequency in response to a difference between the drive frequency and the first frequency;

the control circuit may be configured to operate in the closed loop run mode for a first number of cycles of one of the drive current or the drive signal;

in an embodiment, the circuit may have a counter to count the number of cycles;

the control circuit may be configured to operate in an open loop run mode for a second number of cycles of one of the drive current or the drive signal in response to an end of the first number of cycles, the control circuit configured to form the drive current at a substantially fixed frequency for the second number of cycles, the drive current having a first phase; and the control circuit, such as for example circuit 240 together with circuit 114, may be configured to operate in a sync-brake mode and to form the drive current with a second phase that is opposite to the first phase in response to expiration of the second number of cycles, the control circuit configured to selectively measure a second frequency of a vibration of the linear vibration motor during one of a positive slope or a negative slope of the BEMF signal, the control circuit configured to form the drive current with a third frequency and to adjust the third frequency to be substantially the second frequency, and the control circuit configured to selectively measure an intensity of a vibration of the linear vibration motor during a different one of the positive slope or the negative slope of the BEMF signal and terminate forming the drive current in response to the vibration decreasing to a threshold value.

An embodiment of the control circuit may include a search circuit, such as for example circuit 239, to estimate the eigen frequency of the linear vibration motor.

In another embodiment the control circuit may be configured to selectively disable the second circuit and to not measure the frequency of the vibration of the linear vibration motor in response to the end of the first number of cycles of the drive current.

An embodiment may include a comparator that may be configured to receive a first signal that is representative of the BEMF signal and compare the first signal to a reference signal, and wherein the control circuit is configured to selectively enable the comparator to operate as a non-hysteresis comparator in response to operating to selectively measure the second frequency of the vibration of the linear vibration motor.

In an embodiment, the second circuit may be configured to selectively enable the comparator to operate as a hysteresis comparator in response to operating to selectively measure the intensity of the vibration of the linear vibration motor.

An embodiment of the control circuit may include that the second circuit may include an amplifier configured to receive the BEMF signal and form the first signal that is representative of the BEMF signal.

Another embodiment may include that the control circuit may include a counter configured to count time intervals during a cycle of the drive signal, the control circuit configured to determine if a count of the counter is greater than a count threshold value in response to the different one of the positive slope or the negative slope of the BEMF signal crossing substantially zero.

Those skilled in the art will appreciate that a control circuit for controlling a linear vibration motor may comprise:

a first circuit, such as for example circuits 112 and/or 114, configured to form a first cycle of a drive signal to control a drive frequency of a drive current through the linear vibration motor to cause a vibration of the linear vibration motor, the drive current having a first phase;

a second circuit, such as for example circuit 221 and/or 241 and 204/or part of 110, configured to receive a first back EMF (BEMF) signal from the linear vibration motor in response to a non-conducting portion of the first cycle of the drive signal, the second circuit configured to operate in one of an open loop run mode or a closed loop run mode to form the drive signal wherein the control circuit is configured to adjust the drive frequency to a second frequency that is substantially a frequency of the vibration of the linear vibration motor in the closed loop run mode; and the control circuit configured to form a second cycle of the drive current with a second phase that is opposite to the first phase to slow the vibration of the linear vibration motor wherein the control circuit is configured to receive a second BEMF signal from the linear vibration motor in response to non-conducting portions of the second cycle, the control circuit configured to selectively enable the second circuit to measure another frequency of the vibration of the linear vibration motor in response to one of a positive slope or a negative slope of the second BEMF signal and to adjust a frequency of the second cycle to a third frequency that is substantially the another frequency of the vibration of the linear vibration motor, and the control circuit configured to selectively enable the second circuit to determine if an intensity of the vibration is less than a vibration threshold value in response to a different one of the positive slope or the negative slope of the second BEMF signal.

In another embodiment, the control circuit may also include a comparator that may be configured to selectively operate as a non-hysteresis comparator in response to the control circuit selectively enabling the second circuit to measure the frequency of the vibration of the linear vibration motor and to selectively operate as a hysteresis comparator in response to the control circuit selectively enabling the second circuit to determine if the intensity of the vibration is less than a vibration threshold value.

An embodiment may include that the second circuit may include a counter that counts time intervals of the second cycle and wherein the second circuit is configured to determine if a count value of the counter is greater than a count threshold value in response to an output of the comparator.

In an embodiment, the second circuit may include a counter that counts time intervals of the second cycle and wherein the second circuit is configured to determine if a count value of the counter is greater than a count threshold value in response to a transition of the comparator after one of a substantially zero crossing or modified substantially zero crossing of the second BEMF signal.

In another embodiment, the second circuit may include a resonant frequency search circuit configured to estimate a frequency of a back EMF signal received from the linear vibration motor.

An embodiment may include that the resonant frequency search circuit may be configured to measure a time between to two negative to positive zero crossing transitions of the back EMF signal and estimate an eigen frequency of the linear vibration motor.

Another embodiment may include that the control circuit may include a detector circuit configured to receive the BEMF signal from the linear vibration motor, and includes a zero crossing circuit configured to detect a substantially zero crossings or a modified zero crossing of the BEMF signal.

Those skilled in the art will appreciate that a method of forming a semiconductor device may comprise:

configuring a control circuit of the semiconductor device to form a drive signal to form a drive current at a drive frequency to and a first phase to a linear vibration motor during one of an open loop run mode or a closed loop run mode;

configuring the control circuit to form an anti-drive signal having an anti-drive frequency and a second phase that is substantially opposite to the first phase wherein the anti-drive signal has non-conducting portions of a cycle of the anti-drive signal;

in an embodiment, the control circuit may include a first circuit, such as for example circuit 114, configured to form the anti-drive signal; and configuring the control circuit to form an estimated eigen frequency of the linear vibration motor in response to a non-conducting portion of the anti-drive signal having a first slope and to adjust the anti-drive frequency to another frequency that is substantially the estimated eigen frequency, and configuring the control circuit to determine if a vibration of the linear vibration motor is less than a threshold vibration value in response to a non-conducting portion having a second slope that is opposite to the first slope and to terminate forming the anti-drive signal.

Another embodiment of the method may include configuring the control circuit to receive a BEMF signal from the linear vibration motor during the non-conducting portions and form a first signal that is representative of the BEMF signal, and configuring a comparator to receive the first signal configuring the control circuit to selectively enable the comparator to operate as a non-hysteresis comparator in response to the first slope and to selectively operate as a hysteresis comparator in response to the second slope.

An embodiment may include configuring the control circuit to form an estimated eigen frequency of the linear vibration motor in response to a non-conducting portion of the drive signal and to adjust the drive frequency to a second drive frequency that is substantially the estimated eigen frequency during the closed loop run mode.

The method may have an embodiment that includes configuring the control circuit to selectively enable adjusting the drive frequency to substantially the estimated eigen frequency for a first number of cycles of the drive signal.

Another embodiment may include configuring the control circuit to form the drive frequency at a substantially fixed frequency for a second number of cycles of the drive signal after expiration of the first number of cycles.

An embodiment may include configuring a counter to count cycles of the drive signal to determine the first and second number of drive cycles.

The method may have an embodiment that may include configuring the control circuit to determine if the vibration of the linear vibration motor is less than a threshold vibration value includes configuring a counter to count intervals of the anti-drive signal and configuring the control circuit to determine if a count value of the counter is greater than a count threshold value in response to the second slope.

An example of an embodiment of a semiconductor device may comprise:

a control circuit of the semiconductor device configured to form a drive signal to form a drive current at a drive frequency to and a first phase to a linear vibration motor during one of an open loop run mode or a closed loop run mode;

a first circuit of the control circuit configured to form an anti-drive signal having an anti-drive frequency and a second phase that is substantially opposite to the first phase wherein the anti-drive signal has non-conducting portions of a cycle of the anti-drive signal; and the control circuit configured to form an estimated eigen frequency of the linear vibration motor in response to a non-conducting portion of the anti-drive signal having a first slope and to adjust the anti-drive frequency to another frequency that is substantially the estimated eigen frequency, wherein the control circuit is configured to determine if a vibration of the linear vibration motor is less than a threshold vibration value in response to a non-conducting portion having a second slope that is opposite to the first slope and to terminate forming the anti-drive signal.

An example of an embodiment of a semiconductor device having a circuit may comprise:

a first circuit configured to form a drive signal to form a drive current to a linear vibration motor;

an output configured to receive a BEMF signal from the linear vibration motor;

a second circuit coupled to the receive a signal that is representative of the BEMF signal and to form an estimate of an eigen frequency of the linear vibration motor;

the first circuit configured to form the drive signal at a drive frequency and a first phase and to adjust the drive frequency to a first frequency that is substantially the estimate of the eigen frequency of the linear vibration motor; and a stop control circuit configured to form an anti-drive signal at an anti-drive frequency and a second phase that is substantially opposite to the first phase, wherein the first circuit adjusts the anti-drive frequency of the anti-drive signal to another frequency that is substantially the estimate of the eigen frequency of the linear vibration motor.

In view of all of the above, it is evident that a novel device and method is disclosed. Included, among other features, is forming a control circuit to control the LRA to operate in a closed loop run mode, followed by an open loop run mode, and a break mode where in the frequency of the signal in the break mode is adjusted. Using the open loop run mode for a portion of the time that the LRA is driven to vibrate assist in minimizing the chance that the weight with the case of the LRA thereby reducing audible noise. Additionally, operating in the open loop run mode reduces the circuitry of a control circuit thereby minimizing cost. Using adjusting the frequency of the anti-drive signal in the break mode assist in operating the break mode with a frequency that is near to the design frequency of the LRA which may reduce the amount of time required to stop the vibration of the LRA. Using alternate sloped portions of the BEMF signal in the sync-brake mode facilitates operating the brake mode to both operate with the resonant frequency search operation and to also determine if the vibration of the LRA has substantially stopped. Configuring the comparator to selectively operate as a comparator having a hysteresis input or as a non-hysteresis comparator facilitates selectively operating control circuit 230 to form the estimated eigen frequency or to determine the vibration intensity on alternate non-conducting portions of the drive signal or alternately of the drive current.

While the subject matter of the descriptions are described with specific preferred embodiments and example embodiments, the foregoing drawings and descriptions thereof depict only typical and non-limiting examples of embodiments of the subject matter and are not therefore to be considered to be limiting of its scope, it is evident that many alternatives and variations will be apparent to those skilled in the art. As will be appreciated by those skilled in the art, the example form of circuits 100, 200, and 230 are used as a vehicle to explain the operation method of the brake mode and the sync-brake mode and the sequence of a method that operates the in a closed loop run mode, followed by an open loop run mode, followed by the break mode or the sync-brake mode wherein the frequency of the anti-drive signal is adjusted. Those skilled in the art will appreciate that the circuitry that implements the method may have different embodiments then the circuitry of detector 130, circuit 140, and the detailed circuitry arrangement of circuits 110, 200, and 230.)

As the claims hereinafter reflect, inventive aspects may lie in less than all features of a single foregoing disclosed embodiment. Thus, the hereinafter expressed claims are hereby expressly incorporated into this Detailed Description of the Drawings, with each claim standing on its own as a separate embodiment of an invention. Furthermore, while some embodiments described herein include some but not other features included in other embodiments, combinations of features of different embodiments are meant to be within the scope of the invention, and form different embodiments, as would be understood by those skilled in the art.

The invention claimed is:
1. A semiconductor device including a control circuit for controlling a linear vibration motor comprising:
a first circuit configured to form a drive signal to control a frequency of a drive current through the linear vibration motor;
a second circuit configured to receive a back EMF (BEMF) signal from the linear vibration motor and to selectively measure a first frequency of a vibration of the linear vibration motor;
the control circuit configured to operate in a closed loop run mode and form the drive current at a drive frequency to cause the linear vibration motor to vibrate, the control circuit configured to adjust the drive frequency to substantially the first frequency in response to a difference between the drive frequency and the first frequency;
the control circuit configured to operate in the closed loop run mode for a first number of cycles of one of the drive current or the drive signal;
the control circuit configured to operate in an open loop run mode for a second number of cycles of one of the drive current or the drive signal in response to an end of the first number of cycles, the control circuit configured to form the drive current at a substantially fixed frequency for the second number of cycles, the drive current having a first phase; and
the control circuit configured to operate in a sync-brake mode and to form the drive current with a second phase that is opposite to the first phase in response to expiration of the second number of cycles, the control circuit configured to selectively measure a second frequency of a vibration of the linear vibration motor during one of a positive slope or a negative slope of the BEMF signal, the control circuit configured to form the drive current with a third frequency and to adjust the third frequency to be substantially the second frequency, and the control circuit configured to selectively measure an intensity of a vibration of the linear vibration motor during a different one of the positive slope or the negative slope of the BEMF signal and terminate forming the drive current in response to the vibration decreasing to a threshold value.

2. The control circuit of claim 1 wherein the control circuit is configured to selectively disable the second circuit and to not measure the frequency of the vibration of the linear vibration motor in response to the end of the first number of cycles of the drive current.

3. The control circuit of claim 1 wherein the second circuit includes a comparator configured to receive a first signal that is representative of the BEMF signal and compare the first signal to a reference signal, and wherein the control circuit is configured to selectively enable the comparator to operate as a non-hysteresis comparator in response to operating to selectively measure the second frequency of the vibration of the linear vibration motor.

4. The control circuit of claim 3 wherein the second circuit is configured to selectively enable the comparator to operate as a hysteresis comparator in response to operating to selectively measure the intensity of the vibration of the linear vibration motor.

5. The control circuit of claim 4 wherein the second circuit includes an amplifier configured to receive the BEMF signal and form the first signal that is representative of the BEMF signal.

6. The control circuit of claim 4 wherein the control circuit includes a counter configured to count time intervals during a cycle of the drive signal, the control circuit configured to determine if a count of the counter is greater than a count threshold value in response to the different one of the positive slope or the negative slope of the BEMF signal crossing substantially zero.

7. A control circuit for controlling a linear vibration motor comprising:
a first circuit configured to form a first cycle of a drive signal to control a drive frequency of a drive current through the linear vibration motor to cause a vibration of the linear vibration motor, the drive current having a first phase;
a second circuit configured to receive a first back EMF (BEMF) signal from the linear vibration motor in response to a non-conducting portion of the first cycle of the drive signal, the second circuit configured to operate in one of an open loop run mode or a closed loop run mode to form the drive signal wherein the control circuit is configured to adjust the drive frequency to a second frequency that is substantially a frequency of the vibration of the linear vibration motor in the closed loop run mode; and
the control circuit configured to form a second cycle of the drive current with a second phase that is opposite to the first phase to slow the vibration of the linear vibration motor wherein the control circuit is configured to receive a second BEMF signal from the linear vibration motor in response to non-conducting portions of the second cycle, the control circuit configured to selectively enable the second circuit to measure another frequency of the vibration of the linear vibration motor in response to one of a positive slope or a negative slope of the second BEMF signal and to adjust a frequency of the second cycle to a third frequency that is substantially the another frequency of the vibration of the linear vibration motor, and the control circuit configured to selectively enable the second circuit to determine if an intensity of the vibration is less than a vibration threshold value in response to a different one of the positive slope or the negative slope of the second BEMF signal.

8. The control circuit of claim 7 wherein further including a comparator configured to selectively operate as a non-hysteresis comparator in response to the control circuit selectively enabling the second circuit to measure the frequency of the vibration of the linear vibration motor and to selectively operate as a hysteresis comparator in response to the control circuit selectively enabling the second circuit to determine if the intensity of the vibration is less than a vibration threshold value.

9. The control circuit of claim 7 wherein the second circuit includes a counter that counts time intervals of the second cycle and wherein the second circuit is configured to determine if a count value of the counter is greater than a count threshold value in response to an output of the comparator.

10. The control circuit of claim 9 wherein the second circuit includes a counter that counts time intervals of the second cycle and wherein the second circuit is configured to determine if a count value of the counter is greater than a count threshold value in response to a transition of the comparator after one of a substantially zero crossing or modified substantially zero crossing of the second BEMF signal.

11. The control circuit of claim 10 wherein the control circuit includes a detector circuit configured to receive the BEMF signal from the linear vibration motor, and includes a zero crossing circuit configured to detect a substantially zero crossings or a modified zero crossing of the BEMF signal.

12. The control circuit of claim 7 wherein the second circuit includes a resonant frequency search circuit configured to estimate a frequency of a back EMF signal received from the linear vibration motor.

13. The control circuit of claim 12 wherein the resonant frequency search circuit is configured to measure a time between to two negative to positive zero crossing transitions of the back EMF signal and estimate an eigen frequency of the linear vibration motor.

14. A method of forming a semiconductor device comprising:
configuring a control circuit of the semiconductor device to form a drive signal to form a drive current at a drive frequency to and a first phase to a linear vibration motor during one of an open loop run mode or a closed loop run mode;
configuring the control circuit to form an anti-drive signal having an anti-drive frequency and a second phase that is substantially opposite to the first phase wherein the anti-drive signal has non-conducting portions of a cycle of the anti-drive signal; and
configuring the control circuit to form an estimated eigen frequency of the linear vibration motor in response to a non-conducting portion of the anti-drive signal having a first slope and to adjust the anti-drive frequency to another frequency that is substantially the estimated eigen frequency, and configuring the control circuit to determine if a vibration of the linear vibration motor is less than a threshold vibration value in response to a non-conducting portion having a second slope that is opposite to the first slope and to terminate forming the anti-drive signal.

15. The method of claim 14 further including configuring the control circuit to receive a BEMF signal from the linear vibration motor during the non-conducting portions and form a first signal that is representative of the BEMF signal, and configuring a comparator to receive the first signal configuring the control circuit to selectively enable the comparator to operate as a non-hysteresis comparator in response to the first slope and to selectively operate as a hysteresis comparator in response to the second slope.

16. The method of claim 15 wherein configuring the control circuit to determine if the vibration of the linear vibration motor is less than a threshold vibration value includes configuring a counter to count intervals of the anti-drive signal and configuring the control circuit to determine if a count value of the counter is greater than a count threshold value in response to the second slope.

17. The method of claim 14 further including configuring the control circuit to form an estimated eigen frequency of the linear vibration motor in response to a non-conducting portion of the drive signal and to adjust the drive frequency to a second drive frequency that is substantially the estimated eigen frequency during the closed loop run mode.

18. The method of claim 17 further including configuring the control circuit to selectively enable adjusting the drive frequency to substantially the estimated eigen frequency for a first number of cycles of the drive signal.

19. The method of claim 18 further including configuring the control circuit to form the drive frequency at a substantially fixed frequency for a second number of cycles of the drive signal after expiration of the first number of cycles.

20. The method of claim 18 further including configuring a counter to count cycles of the drive signal to determine the first and second number of drive cycles.

* * * * *